US010306477B2

(12) United States Patent
Oizumi et al.

(10) Patent No.: US 10,306,477 B2
(45) Date of Patent: May 28, 2019

(54) WIRELESS COMMUNICATION SYSTEM

(71) Applicant: Panasonic Intellectual Property Management Co., Ltd., Osaka (JP)

(72) Inventors: Toru Oizumi, Kanagawa (JP); Takeshi Hatakeyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 414 days.

(21) Appl. No.: 14/886,713

(22) Filed: Oct. 19, 2015

(65) Prior Publication Data

US 2016/0119914 A1    Apr. 28, 2016

(30) Foreign Application Priority Data

Oct. 23, 2014  (JP) .................... 2014-216531

(51) Int. Cl.
*H04W 16/14* (2009.01)
*H04W 72/04* (2009.01)
*H04W 84/12* (2009.01)
*H04B 7/185* (2006.01)

(52) U.S. Cl.
CPC ......... *H04W 16/14* (2013.01); *H04B 7/18508* (2013.01); *H04W 72/0453* (2013.01); *H04W 84/12* (2013.01)

(58) Field of Classification Search
None
See application file for complete search history.

(56) References Cited

U.S. PATENT DOCUMENTS

| 2002/0080855 | A1* | 6/2002 | Watanabe | H04B 1/7143 375/132 |
| 2002/0168943 | A1* | 11/2002 | Callaway, Jr. | H04W 52/24 455/67.11 |
| 2003/0108062 | A1* | 6/2003 | Agrawal | H04L 45/00 370/463 |
| 2006/0188004 | A1 | 8/2006 | Kizu et al. | |
| 2007/0123183 | A1* | 5/2007 | Chien | H04B 15/06 455/114.2 |
| 2009/0274193 | A1 | 11/2009 | Kizu et al. | |
| 2013/0163641 | A1 | 6/2013 | Kizu et al. | |
| 2013/0163642 | A1 | 6/2013 | Kizu et al. | |
| 2014/0089017 | A1* | 3/2014 | Klappert | G06Q 10/02 705/5 |

(Continued)

FOREIGN PATENT DOCUMENTS

| JP | 2002-198868 | 7/2002 |
| JP | 2005-136885 | 5/2005 |

(Continued)

*Primary Examiner* — Adnan Baig
(74) *Attorney, Agent, or Firm* — McDermott Will & Emery LLP

(57) ABSTRACT

A wireless communication system of the present disclosure includes a first wireless communication device that performs wireless communication in a first communication scheme, a terminal device that performs wireless communication in the first communication scheme with the first wireless communication device, and a plurality of second wireless communication devices that can perform wireless communication in a second communication scheme different from the first communication scheme, and function as access points.

18 Claims, 14 Drawing Sheets

(56) References Cited

U.S. PATENT DOCUMENTS

2014/0328376 A1 11/2014 Kizu et al.
2015/0133185 A1* 5/2015 Chen ................ H04W 72/1215
455/552.1

FOREIGN PATENT DOCUMENTS

| JP | 2006-211242 | 8/2006 |
|---|---|---|
| JP | 2007-074060 | 3/2007 |
| JP | 2008-048148 | 2/2008 |

* cited by examiner

WIRELESS COMMUNICATION SYSTEM

BACKGROUND

1. Technical Field

The present disclosure relates to a wireless communication system under an environment where two or more communication schemes using overlapping frequency bands are available.

2. Description of the Related Art

Unexamined Japanese Patent Publication No. 2008-48148 discloses a mobile communication system and a technology to allocate frequencies to be used in the mobile communication system. In this system, when a terminal subordinate to a base station is located in the vicinity of a cell boundary between the base station and an adjacent base station, the base station allocates the subordinate terminal a frequency different from a frequency of the adjacent base station. On the other hand, when the location of the subordinate terminal is other than the above, the base station allocates the terminal the same frequency as the adjacent base station for communication in the disclosed technology.

Increasing variety of communication schemes in recent years has caused increased environments where communication standards using overlapping frequency bands, such as a Wi-Fi (registered trademark, the same applies hereinafter) standard and a Bluetooth (registered trademark, the same applies hereinafter) standard that use frequency bands in the vicinity of 2.4 GHz, are simultaneously used.

SUMMARY

A wireless communication system of the present disclosure includes a first wireless communication device that performs wireless communication in a first communication scheme, a terminal device that performs wireless communication in the first communication scheme with the first wireless communication device, and a plurality of second wireless communication devices that can perform wireless communication in a second communication scheme different from the first communication scheme, and function as access points. In the first communication scheme, out of M (M: a positive integer) communication channels, P (P: a positive integer, P<M) or more communication channels are used. N (N: a positive integer, N<M) communication channels out of the M communication channels overlap, in frequency, K (K: a positive integer, K<N) communication channels used in the second communication scheme. When P>(M−N) is established, m (m: a positive integer, P≤m<M) communication channels are used in wireless communication between the first wireless communication device and the terminal device, and the m communication channels are determined according to a positional relationship between the terminal device and each of the plurality of second wireless communication devices.

A wireless communication system according to another exemplary embodiment of the present disclosure includes a plurality of first wireless communication devices each of which performs wireless communication in a first communication scheme, a plurality of terminal devices each of which performs wireless communication in the first communication scheme, and a plurality of second wireless communication devices that perform wireless communication in a second communication scheme different from the first communication scheme, and function as access points. In this wireless communication system, there are a plurality of pairs of the first wireless communication devices and the terminal devices that perform one-to-one wireless communication. In the first communication scheme, out of M (M: a positive integer) communication channels, P (P: a positive integer, P<M) or more communication channels are used. N (N: a positive integer, N<M) communication channels out of the M communication channels overlap, in frequency, K (K: a positive integer, K<N) communication channels used in the second communication scheme. When P>(M−N) is established, and m (m: a positive integer, P≤m<M) communication channels are used in the wireless communication in each of the pairs of the first wireless communication devices and the terminal devices, out of the M communication channels, (M−N) communication channels belonging to a frequency band not overlapping a communication channel used in the second communication scheme are preferentially used.

A wireless communication system according to the present disclosure can reduce mutual interference under an environment where two or more communication schemes using overlapping frequency bands are available.

DETAILED DESCRIPTION

Hereinafter, exemplary embodiments will be described in detail with reference to the drawings as appropriate. However, an unnecessarily detailed description will not be provided. For example, a detailed description of a well-known matter and a redundant description on substantially the same configuration will not be provided. This is to prevent the following description from being unnecessarily redundant, so as to facilitate understanding of those skilled in the art.

The inventor(s) of the present disclosure provide the accompanying drawings and the following descriptions for those skilled in the art to fully understand the present disclosure, and do not intend to limit a subject described in the claims by the accompanying drawings and the following descriptions.

First Exemplary Embodiment

Hereinafter, a first exemplary embodiment will be described with reference to FIGS. 1 to 10.

1-1. Configuration

[1-1-1. Network Environment]

Figure 1:
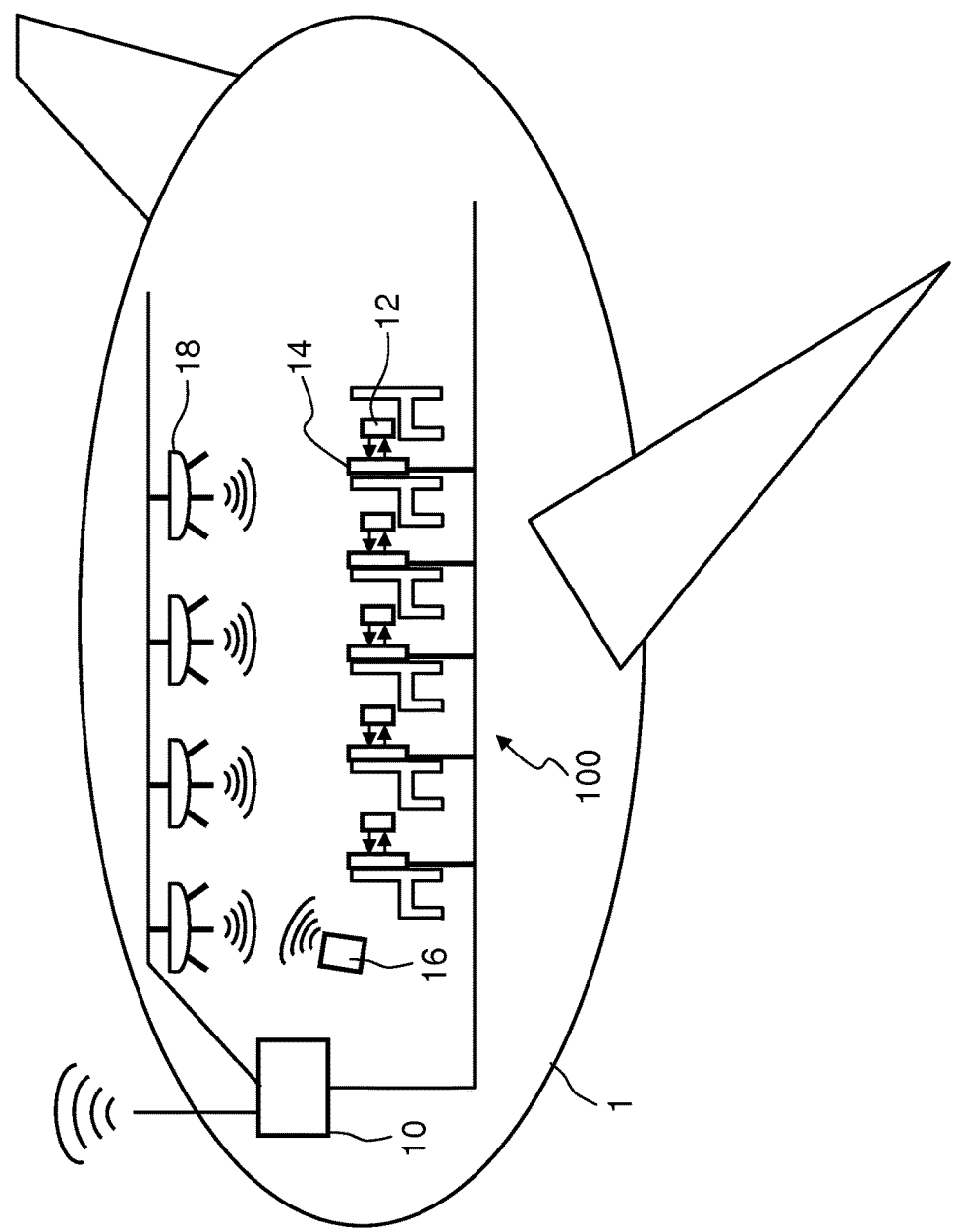
FIG. 1 is a diagram illustrating a schematic configuration of wireless communication system 100 according to the present disclosure, provided in a cabin of aircraft 1.
Figure 2:
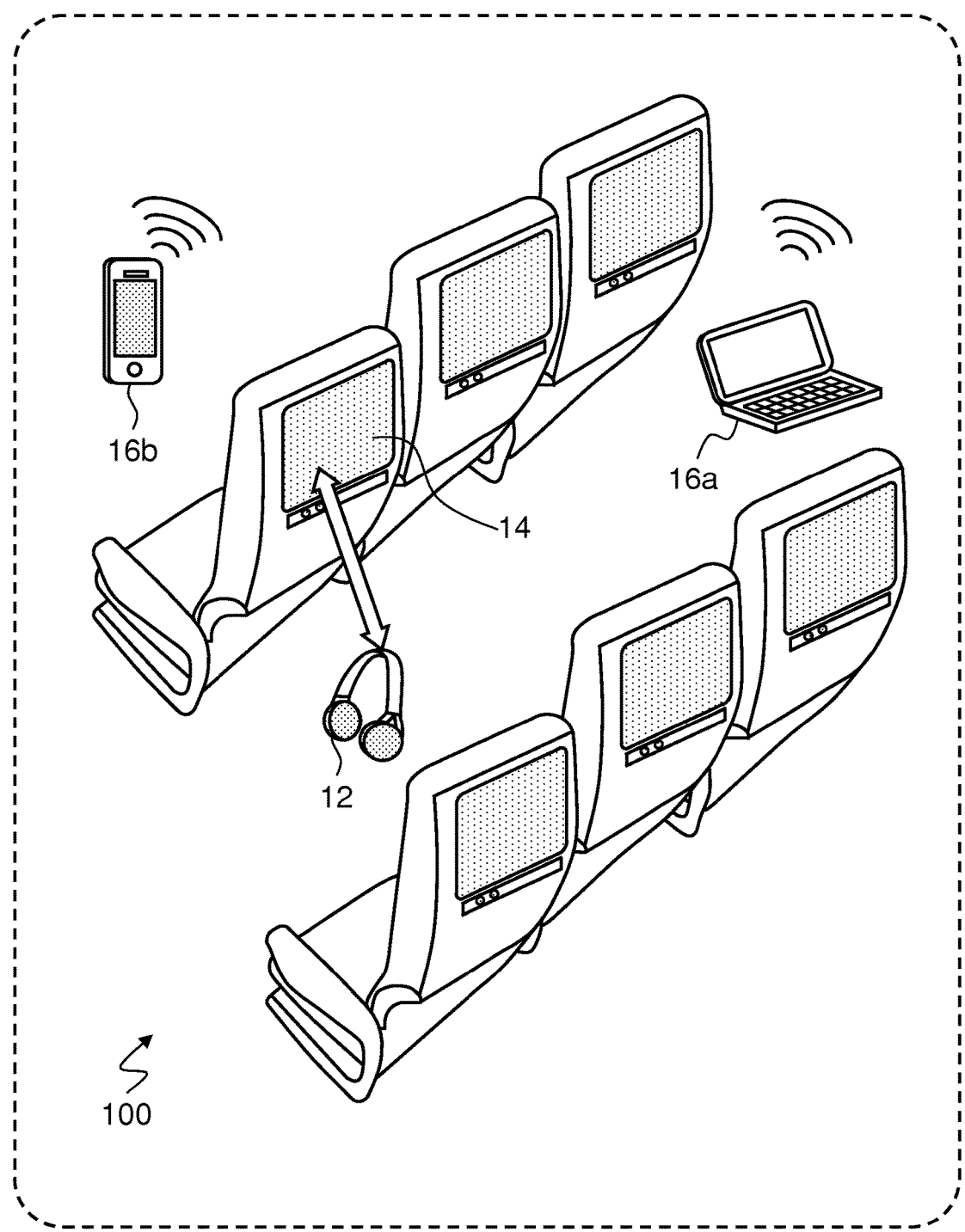
FIG. 2 is a partially enlarged view of the inside of a passenger cabin in aircraft 1.

FIG. 1 illustrates a schematic configuration of wireless communication system 100 according to the present disclosure, provided in a cabin of aircraft 1. FIG. 2 is a partially enlarged view of the inside of a passenger cabin in aircraft 1.

As shown in FIG. 1, wireless communication system 100 has server device 10, a plurality of wireless communication devices (hereinafter "BT terminals") 12 supporting a Bluetooth standard, a plurality of seat monitors 14, a Wi-Fi standard communication device (hereinafter "Wi-Fi terminal") 16, and a plurality of wireless LAN access points (hereinafter "wireless access points") 18 supporting a Wi-Fi standard.

Server device 10 and each seat monitor 14, and server device 10 and each wireless access point 18 are connected by a wired LAN.

Server device 10 holds two or more types of content such as music and video. Server device 10 provides content required by a passenger on aircraft 1 using seat monitor 14. Server device 10 also receives a request from Wi-Fi terminal 16 via wireless access point 18 and transmits the request to an external server (not shown) through a satellite communication channel, for example. Server device 10 transmits data received from the external server to Wi-Fi terminal 16 via wireless access point 18.

Each BT terminal 12 is a wireless communication device supporting the Bluetooth standard, which is used by a passenger. In the present disclosure, BT terminal 12 is provided to each seat on aircraft 1. As shown in FIG. 2, BT terminal 12 is, for example, headphones supporting the Bluetooth standard, and performs Bluetooth standard communication with seat monitor 14 to reproduce audio of content being reproduced on seat monitor 14.

Each seat monitor 14 is a multimedia terminal device with a monitor, provided to each seat on aircraft 1. As described above, seat monitor 14 is connected to server device 10 via a wired channel, and can communicate with BT terminal 12 through a radio channel. Seat monitor 14 is typically a monitor with a touch screen panel, and receives designation of content from a passenger on the touch screen panel and requests server device 10 to provide the content via the wired channel. Seat monitor 14 transmits audio signals to BT terminal 12 by Bluetooth standard wireless communication while displaying content received from server device 10 on the monitor.

Each Wi-Fi terminal 16 is a communication device supporting the Wi-Fi standard, carried onto aircraft 1 by a passenger, for example. As shown in FIG. 2, Wi-Fi terminals 16 include PC 16a and smartphone 16b supporting the Wi-Fi standard, for example.

Each wireless access point 18 is a base station that is provided in the passenger cabin of aircraft 1 and performs Wi-Fi standard communication. For example, wireless access points 18 are provided on a ceiling of a passenger cabin central portion in a straight line or in a zigzag formation. In this exemplary embodiment, wireless access points are installed so that there are areas that allow communication without causing mutual radio wave interference. For adjacent wireless access points, different channels are set. This allows communication to be performed without interference of radio waves. In this specification, channel numbers of wireless access points 18 are fixed. Devices to communicate with each other need to use the same channel.

[1-1-2. Frequency Band]

Here, "channels" will be described.

In wireless communication, a predetermined frequency band is divided into two or more for the purpose of preventing radio wave interference so that a plurality of devices can simultaneously communicate. "Channels" refer to frequency bands after such division. Each channel can be specified by a center frequency and a bandwidth.

Figure 3:
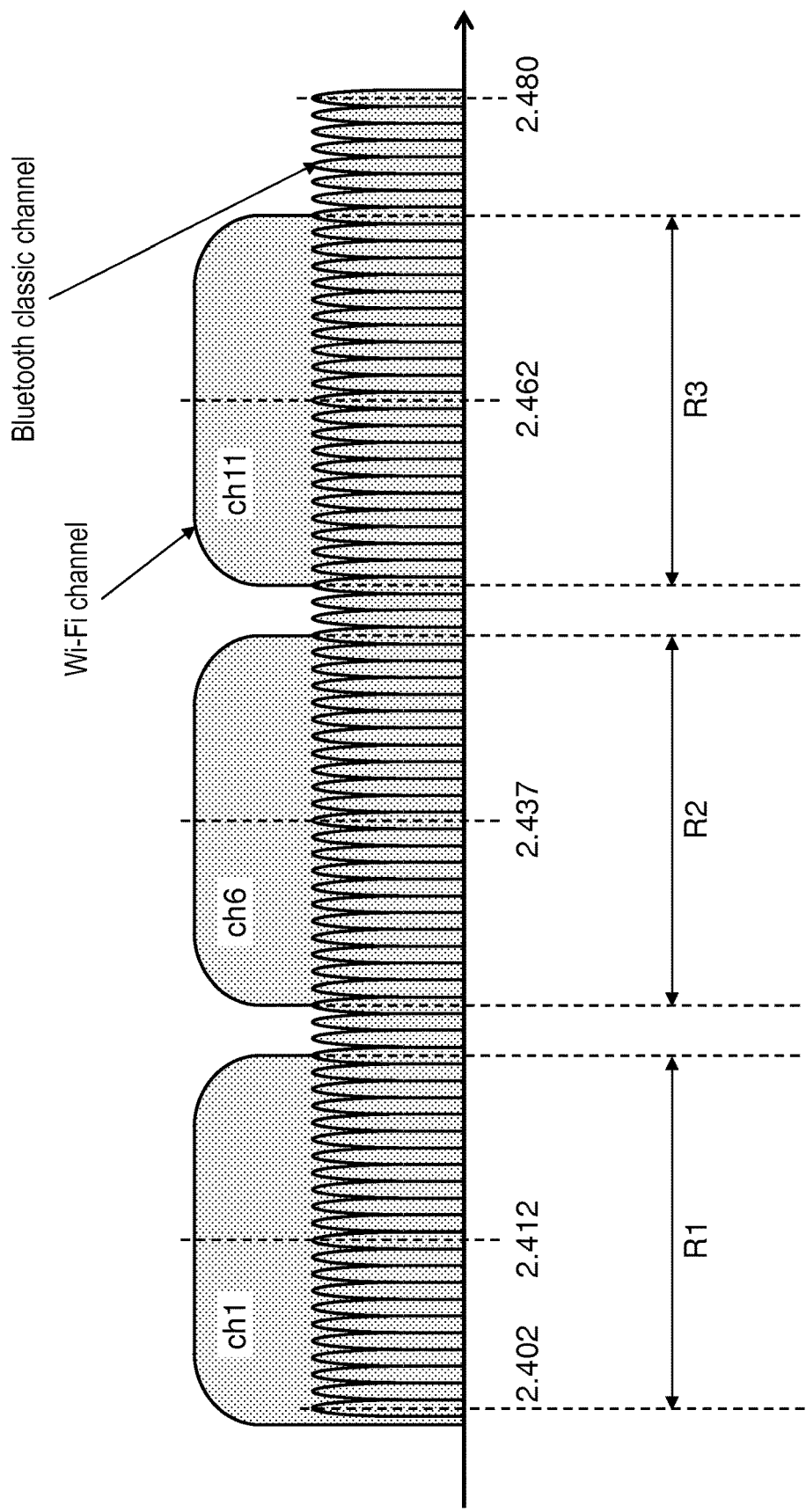
FIG. 3 is a diagram illustrating an example of a channel group of a Wi-Fi standard and a channel group of a Bluetooth standard.

FIG. 3 illustrates an example of a channel group of the Wi-Fi standard and a channel group of the Bluetooth standard. The Wi-Fi standard and the Bluetooth standard have respective unique channels. Either standard divides a frequency band in the vicinity of 2.4 GHz to set a plurality of channels. The Bluetooth standard will be described here as meaning a Bluetooth Classic standard as an example. In order to clarify which standard a channel is based on, a Wi-Fi standard channel is sometimes described as a "Wi-Fi channel," and a Bluetooth standard channel is sometimes described as a "Bluetooth channel" or a "BT channel."

A Wi-Fi standard channel group has thirteen or fourteen channels. Each channel has a bandwidth of 22 MHz. A Wi-Fi standard generally uses three channels that do not interfere with each other. Three channels include, for example, channels 1, 6, and 11. FIG. 3 illustrates three channels of channels 1, 6, and 11. Center frequencies of channels 1, 6, and 11 are 2.412, 2.437, and 2.462 GHz, respectively. Channels 1 and 6, and channels 6 and 11 are more than 22 MHz apart from each other. Thus, radio wave interference does not occur between these channels.

A Bluetooth standard channel group has 79 channels. Each channel has a bandwidth of 1 MHz. FIG. 3 shows the channel group. Center frequencies of the channels are, from the lowest, 2.402, 2.403, 2.404, . . . , 2.480 GHz. The channels are 1 MHz apart from each other. Thus, radio wave interference does not occur between the channels.

The Bluetooth standard requires setting at least a sum of 20 Bluetooth Classic channels, and performs pseudorandom hopping among the channels during communication. Bluetooth channels to be used/not to be used for communication can be determined by three methods.

A first is a method based on channel classification information set to Bad/Unknown by a higher-level device (e.g. server device 10) (Channel classification information from the Host using the HCI Set_AFH_channel_classification command). A second is a method based on channel classification information determined as Good/Bad/Unknown from measurement by a Bluetooth master device (e.g. seat monitor 14) (Channel classification from local measurements). A third is a method based on channel classification information reported as Good/Bad/Unknown from a slave device (e.g. BT terminal 12) (Channel classification reports received from slaves in LMP_channel_classification PDUs).

[1-1-3. Problems Recognized by the Inventor(s) of the Present Disclosure and Findings of the Inventor(s) of the Present Disclosure]

As shown in FIG. 3, part of the Wi-Fi standard frequency band and part of the Bluetooth standard frequency band overlap each other. When Bluetooth channels interfering with the three Wi-Fi channels are subtracted from the Bluetooth standard 79 channels, the remaining Bluetooth channels are 11 to 14 channels.

The inventor(s) of the present disclosure have conceived performing Bluetooth standard communication using channels in a frequency band that does not overlap a used Wi-Fi standard frequency band, or overlaps the used Wi-Fi standard frequency band but provides a small interference effect.

Problems recognized by the inventor(s) of the present disclosure will be described below.

In an environment where a frequency band of Bluetooth channels overlap frequency bands of three Wi-Fi channels (e.g. ch1, ch6, ch11), an attempt to communicate using channels that are determined as available from measurement by a Bluetooth master device, or channels that are reported as available from a slave device may greatly affect a Wi-Fi environment.

For example, as shown in FIG. 3, Wi-Fi channel 1 and Bluetooth channels (1st to 22nd channels from the lowest one in frequency) use overlapping frequency band R1. The frequency bands of Wi-Fi channels 6 and 11 and the frequency band of the Bluetooth channels also use overlapping frequency bands R2 and R3.

Assume that now BT terminal 12 is located immediately below wireless access point 18 of Wi-Fi channel 1, and wireless access points 18 of Wi-Fi channels 6 and 11 are located farther than wireless access point 18 of channel 1. When seat monitor 14 performs measurement at a timing when there is no data transmission on Wi-Fi channel 1, and there is data transmission on channels 6 and 11, seat monitor 14 determines that Wi-Fi channel 1 is not used by BT terminal 12, and generates channel classification information that Bluetooth channels interfering with Wi-Fi channel 1 are available.

However, when data transmission is started on Wi-Fi channel 1, interference with Bluetooth communication occurs at corresponding wireless access point 18 because wireless access point 18 using channel 1 is present in the vicinity of BT terminal 12. This results in a high possibility that a CSMA/CA (Carrier Sense Multiple Access/Collision Avoidance) system prevents communication, disabling data transmission. The possibility becomes higher as a number of BT terminals 12 increases.

Figure 4:
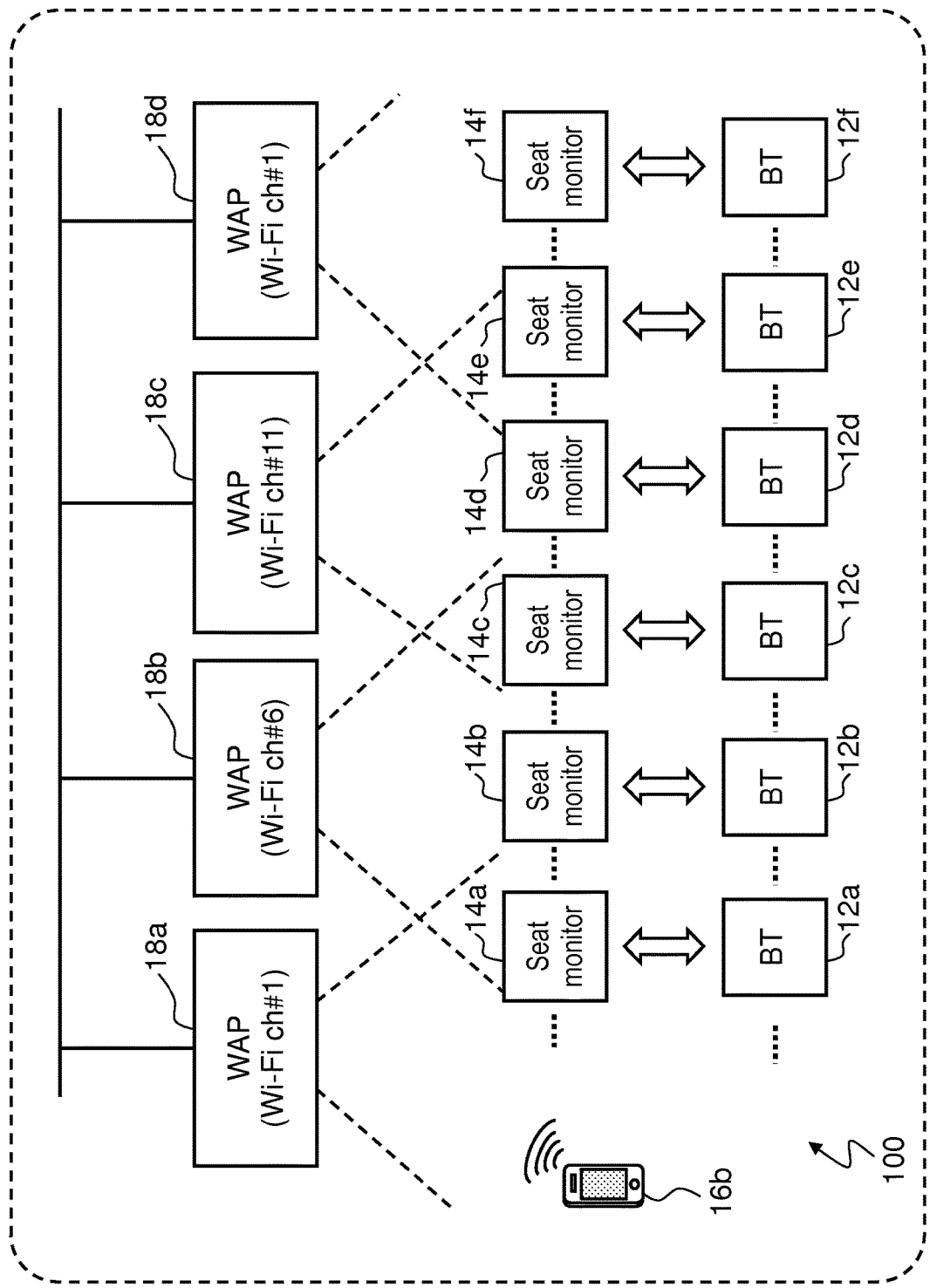
FIG. 4 is a diagram more schematically illustrating a configuration in FIGS. 1 and 2.

FIG. 4 more schematically illustrates a configuration in FIGS. 1 and 2. In an upper row, wireless access points (WAP) 18a to 18d are provided. In a middle row, seat monitors 14a to 14f are provided. In a lower row, BT terminals 12a to 12f are provided. FIG. 4 illustrates single Wi-Fi terminal 16b.

Wireless access points 18a and 18d are allocated Wi-Fi channel 1. Wireless access points 18b and 18c are allocated Wi-Fi channels 6 and 11, respectively. This reduces radio wave interference between Wi-Fi standard communications.

Radio wave directivity is set relatively wide in aircraft 1 because there is a need to cause radio waves to reach each seat. As a result, there is a case where radio waves emitted from wireless access points adjacent to each other are both available, depending on a seat layout. For example, seat monitors 14a, 14c, and 14e in FIG. 4 can obtain radio waves of adjacent two Wi-Fi channels. On the other hand, seat monitors 14b, 14d, and 14f are all arranged in a position where only radio waves of single wireless access point 18 can be received.

The inventor(s) of the present disclosure have found a method below by which to determine channels to be used by each BT terminal 12 under the above-described environment.

BT terminal 12a and seat monitor 14a that communicates with BT terminal 12a will be described as an example. First, seat monitor 14a grasps a Wi-Fi channel used by the nearest wireless access point, based on distances between seat monitor 14a and wireless access points 18a to 18d. In this example, wireless access point 18a is physically nearest to seat monitor 14a.

Table 1 shows previously created positional relationship between each seat monitor 14 and the nearest wireless access point. In this specification, Table 1 is also sometimes referred to as a positional relationship table. Table 1 holds wireless access points together with their Wi-Fi channel numbers. Table 1 further includes information on the second nearest wireless access points and their channel numbers. This information is set when seat monitors 14a, 14c, and 14e in FIG. 4 are arranged in a position where communication with two or more wireless access points is possible. This is because there is a situation where a Bluetooth channel can interfere with two or more Wi-Fi channels.

TABLE 1

| Seat Monitor | Nearest Wireless Access Point and Channel Number | | Second Nearest Wireless Access Point and Channel Number | |
|---|---|---|---|---|
| 14a | #1 | 1 | #2 | 6 |
| 14b | #2 | 6 | — | — |
| 14c | #2 | 6 | #3 | 11 |
| 14d | #3 | 11 | — | — |
| 14e | #4 | 1 | #3 | 11 |
| 14f | #4 | 1 | — | — |
| ... | ... | ... | ... | ... |

The words "Nearest" and "Second Nearest" in Table 1 mean that a distance between a seat position where seat monitor 14 is provided and wireless access point 18 is the shortest and the second shortest, respectively. The term "distance" referred to herein is a distance with a height direction taken into account when wireless access points 18 are provided on a passenger cabin ceiling in aircraft 1.

Seat monitor 14a generates channel classification information so as not to use Wi-Fi channel 1, based on the information shown in Table 1.

A range in which communication by the Bluetooth standard is possible is generally smaller than a range in which communication by the Wi-Fi standard is possible. Therefore, seat monitor 14a may regard a position of BT terminal 12a or a position of seat monitor 14 itself (position of its own device) as a position of BT terminal 12a.

When seat monitor 14a is provided in a position where communication on not only channel 1 but also channel 6 is possible, it is preferable to generate channel classification information so as not to use Bluetooth channels that overlap channel 6 used by second nearest wireless access point 18b. Alternatively, when the second nearest wireless access point is more than or equal to a prescribed distance away, Bluetooth channels overlapping Wi-Fi channel 6 used at the wireless access point may be set to be used.

Figure 5:
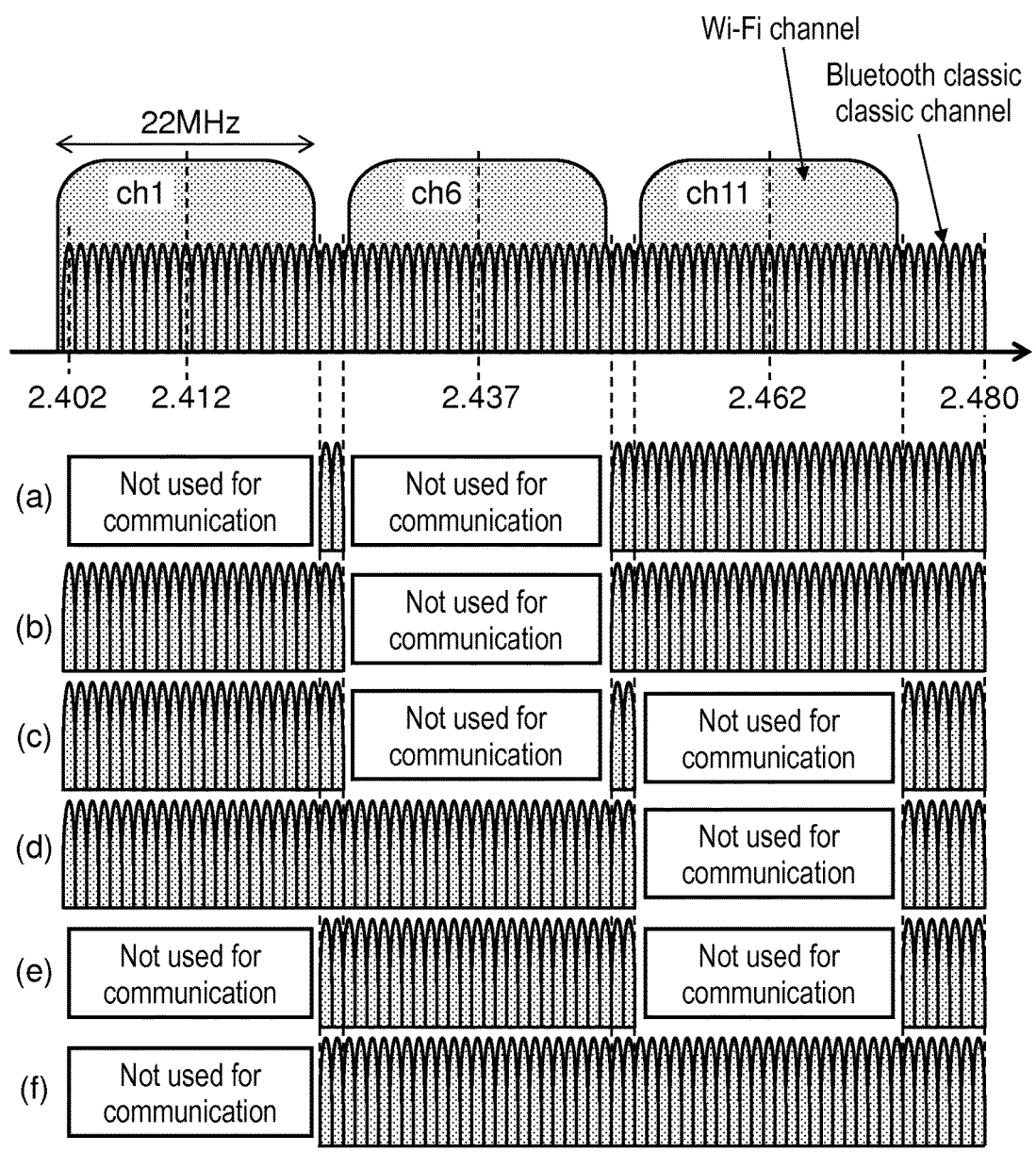
FIG. 5 is a diagram illustrating an example of Bluetooth standard channel allocation that can reduce interference between Wi-Fi standard channels and Bluetooth standard channels.

FIG. 5 shows an example in which the above-described method of determining Bluetooth channels at BT terminal 12a and seat monitor 14a is applied to BT terminals 12a to 12f and seat monitors 14a to 14f in FIG. 4, individually.

FIG. 5 illustrates an example of Bluetooth standard channel allocation found by the inventor(s) of the present disclosure, which can reduce interference between Wi-Fi standard channels and Bluetooth standard channels.

FIG. 5(a) shows channels to be used or not to be used in Bluetooth standard communication between BT terminal 12a and seat monitor 14a described above.

FIG. 5(b) shows channels to be used or not to be used in Bluetooth standard communication between BT terminal 12b and seat monitor 14b described above. In this example, Bluetooth channels in a frequency band overlapping Wi-Fi channel 6 are not used, and the other Bluetooth channels are used.

FIG. 5(c) shows channels to be used or not to be used in Bluetooth standard communication between BT terminal 12c and seat monitor 14c described above. In this example, Bluetooth channels in frequency bands overlapping Wi-Fi channels 6 and 11 are not used, and the other Bluetooth channels are used.

FIG. 5(d) shows channels to be used or not to be used in Bluetooth standard communication between BT terminal 12d and seat monitor 14d described above. In this example, Bluetooth channels in a frequency band overlapping Wi-Fi channel 11 are not used, and the other Bluetooth channels are used.

FIG. 5(e) shows channels to be used or not to be used in Bluetooth standard communication between BT terminal 12e and seat monitor 14e described above. In this example, Bluetooth channels in frequency bands overlapping Wi-Fi channels 1 and 11 are not used, and the other Bluetooth channels are used.

FIG. 5(f) shows channels to be used or not to be used in Bluetooth standard communication between BT terminal 12f and seat monitor 14f described above. In this example, Bluetooth channels in a frequency band overlapping Wi-Fi channel 1 are not used, and the other Bluetooth channels are used.

As above, in wireless communication system 100 according to this exemplary embodiment, 65 to 68 channels out of the 79 channels used in the Bluetooth standard overlap in frequency bands one of the three communication channels of the Wi-Fi standard that do not overlap each other. For Bluetooth standard communication between BT terminal 12 and seat monitor 14, channels other than 22 Bluetooth channels that overlap a single Wi-Fi channel in frequency bands are used. Alternatively, for wireless communication between BT terminal 12 and seat monitor 14, channels other than 44 Bluetooth channels overlapping two Wi-Fi channels in frequency bands are used. Bluetooth channels to be used are determined according to positional relationships between seat monitors 14 and wireless access points 18. Determination of Bluetooth channels in this manner allows setting of Bluetooth channels, avoiding a Wi-Fi channel that will be most affected by interference, to independently perform communication based on the Wi-Fi standard and the Bluetooth standard.

Bluetooth channels to be used in communication between BT terminal 12 and seat monitor 14 are determined by seat monitor 14, based on channels given a status of "Good" in channel classification information.

Alternatively, server device 10 may determine Bluetooth channels. Server device 10 holds information on positions of seat monitors 14. Server device 10 performs the same processing as the above-described processing of seat monitor 14, and, as a higher-level device, generates channel classification information showing Bluetooth channels not to be used by Bad/Unknown. Server device 10 may direct seat monitor 14 to use Bluetooth channels not designated in the channel classification information in communication between BT terminal 12 and seat monitor 14.

1-2. Details of Configuration of Wireless Communication System 100 According to the Present Disclosure Components of wireless communication system 100 will be described below.

[1-2-1. Configuration of Server Device 10]

Figure 6:
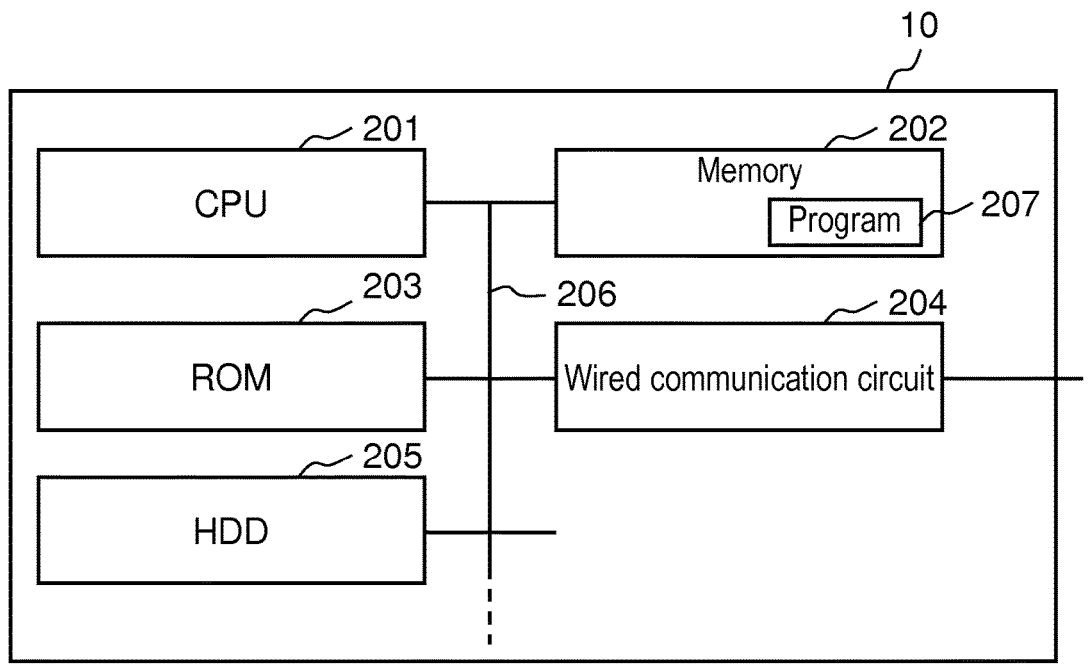
FIG. 6 is a diagram illustrating a hardware configuration of server device 10.

FIG. 6 illustrates a hardware configuration of server device 10.

Server device 10 has CPU 201, memory (RAM) 202, ROM 203, wired communication circuit 204, HDD 205, and bus 206. The components of server device 10 are connected to be communicable with each other by bus 206.

CPU 201 is a signal processing circuit that controls an operation of entire server device 10. In this specification, CPU 201 is sometimes referred to as an arithmetic circuit or a control circuit. CPU 201 receives a request for content from seat monitor 14 via wired communication circuit 204, and reads the designated content from HDD 205 and transmits the content to seat monitor 14.

When server device 10 functions as a higher-level device for the Bluetooth standard, CPU 201 generates channel classification information set to Bad/Unknown, using the positional relationships (Table 1) between seat monitors 14 and wireless access points 18 held in HDD 205. Processing details will be described below.

In addition to generating channel classification information, or in place of generating channel classification information, CPU 201 may determine Bluetooth channels to be used in communication between BT terminal 12 and seat monitor 14, and direct seat monitor 14 to use the Bluetooth channels.

Processing of server device 10 is implemented by CPU 201 executing computer program 207 developed in memory 202. ROM 203 may store computer program 207.

[1-2-2. Configuration of BT Terminal 12]

Figure 7:
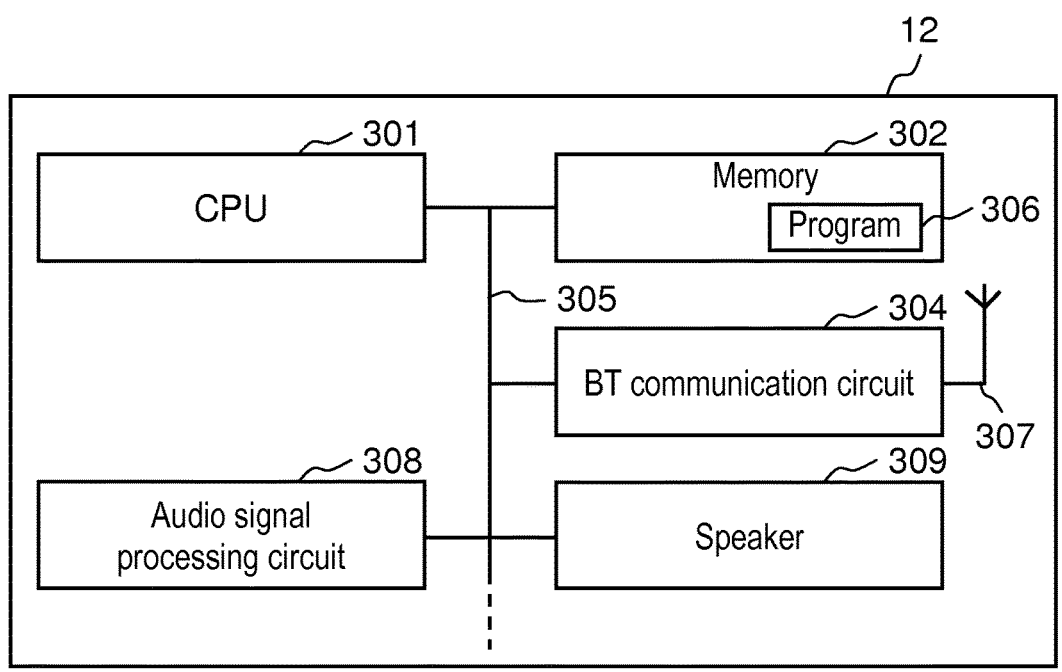
FIG. 7 is a diagram illustrating a hardware configuration of BT terminal 12.

FIG. 7 illustrates a hardware configuration of BT terminal 12.

BT terminal 12 has CPU 301, memory (RAM) 302, Bluetooth standard wireless communication circuit (hereinafter "BT communication circuit") 304, bus 305, antenna 307, audio signal processing circuit 308, and speaker 309. The components of BT terminal 12 are connected to be communicable with each other by bus 305.

CPU 301 is a signal processing circuit that controls an operation of entire BT terminal 12. In this specification, CPU 301 is sometimes referred to as an arithmetic circuit or a control circuit. CPU 301 performs processing in FIG. 9 described below, communicating with seat monitor 14, and establishes pairing between itself and seat monitor 14. The processing is implemented by CPU 301 executing computer program 306 stored in memory 302, for example. BT terminal 12 may additionally include ROM (not shown) to store computer program 306.

BT terminal 12 has a communication function in compliance with the Bluetooth standard. BT communication circuit 304 performs communication processing on the Bluetooth standard using antenna 307. BT communication circuit 304 supplies predetermined receiving power and transmitting power to antenna 307 using power of a battery (not shown), and gives and receives data by wireless communication. BT communication circuit 304 has been described as performing both transmission and reception, but the operations are implemented by a transmitting circuit and a receiving circuit both connected to antenna 307. BT terminal 12 may have a communication function in compliance with a communication standard (e.g. the Wi-Fi standard) other than the Bluetooth standard.

Audio signal processing circuit 308 is a circuit that processes signals of audio to be output from speaker 309.

Speaker 309 is a device that vibrates a cone by electrical signal energy to generate sound waves.

[1-2-3. Configuration of Seat Monitor 14]

Figure 8:
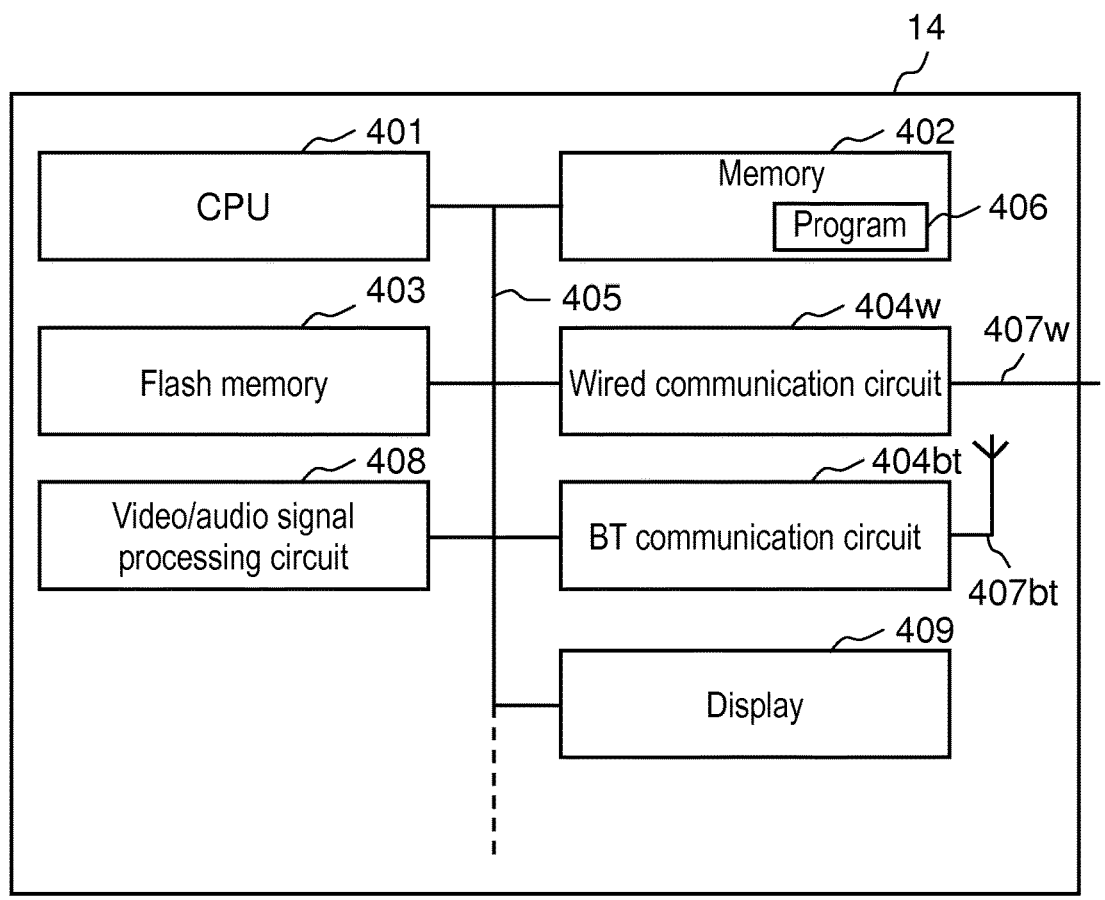
FIG. 8 is a diagram illustrating a hardware configuration of seat monitor 14.

FIG. 8 is a hardware configuration of seat monitor 14.

Seat monitor 14 has CPU 401, memory (RAM) 402, flash memory 403, wired communication circuit 404w, Bluetooth standard wireless communication circuit (hereinafter "BT communication circuit") 404bt, bus 405, display 409, wiring 407w, antenna 407bt, and video/audio signal processing circuit 408. The components of seat monitor 14 are connected to be communicable with each other by bus 405.

CPU 401 is a signal processing circuit that controls an operation of entire seat monitor 14. In this specification, CPU 401 is sometimes referred to as an arithmetic circuit or a control circuit. CPU 401 performs processing in FIG. 9 described below, communicating with BT terminal 12, and established pairing between itself and BT terminal 12. The processing is implemented by CPU 401 executing computer program 406 stored in memory 402, for example. Flash memory 403 stores video data and audio data. Flash memory 403 may further store computer program 406, or ROM (not shown) to store computer program 406 may be additionally included.

Seat monitor 14 has a communication function in compliance with the Bluetooth standard. BT communication circuit 404bt performs communication processing on the Bluetooth standard using antenna 407bt. BT communication circuit 404bt supplies predetermined receiving power and transmitting power to antenna 407bt using power of an aircraft battery (not shown), and gives and receives data by wireless communication. BT communication circuit 404bt has been described as performing both transmission and reception, but the operations are implemented by a transmitting circuit and a receiving circuit both connected to antenna 407bt. Seat monitor 14 may have a communication function in compliance with a communication standard (e.g. the Wi-Fi standard) other than the Bluetooth standard.

Video/audio signal processing circuit 408 is a circuit that processes signals of video to be displayed on display 409 and audio to be output from a speaker (not shown). Video/audio signal processing circuit 408 may be separated into a video-only circuit and an audio-only circuit.

Display 409 is a display device that displays video. Like a smartphone, display 409 may be configured to be provided with a touch screen panel so that a user can touch a display position for input. Display 409 may also be provided with an input device such as a button.

Wi-Fi terminal 16 and wireless access point 18 will not be illustrated. Wireless access point 18 may be any apparatus that performs an operation in compliance with the Wi-Fi standard. For example, wireless access point 18 communicates on a preset Wi-Fi channel, and converts a signal obtained through communication into an electrical signal internally, and transmits the signal to a different component. Wireless access point 18 also converts an electrical signal obtained from a different component (such as server device 10) into a radio signal on the Wi-Fi standard and emits the signal. Wireless access point 18 only needs to include a wireless transmitting/receiving circuit, a processor, and a buffer memory to perform these operations.

Wi-Fi terminal 16 performs wireless communication in compliance with the Wi-Fi standard with wireless access point 18. Channels used are the same as each other. As described above, Wi-Fi terminals 16 are PC 16a and smartphone 16b supporting the Wi-Fi standard, for example (FIG. 2).

1-3. Operation

Figure 9:
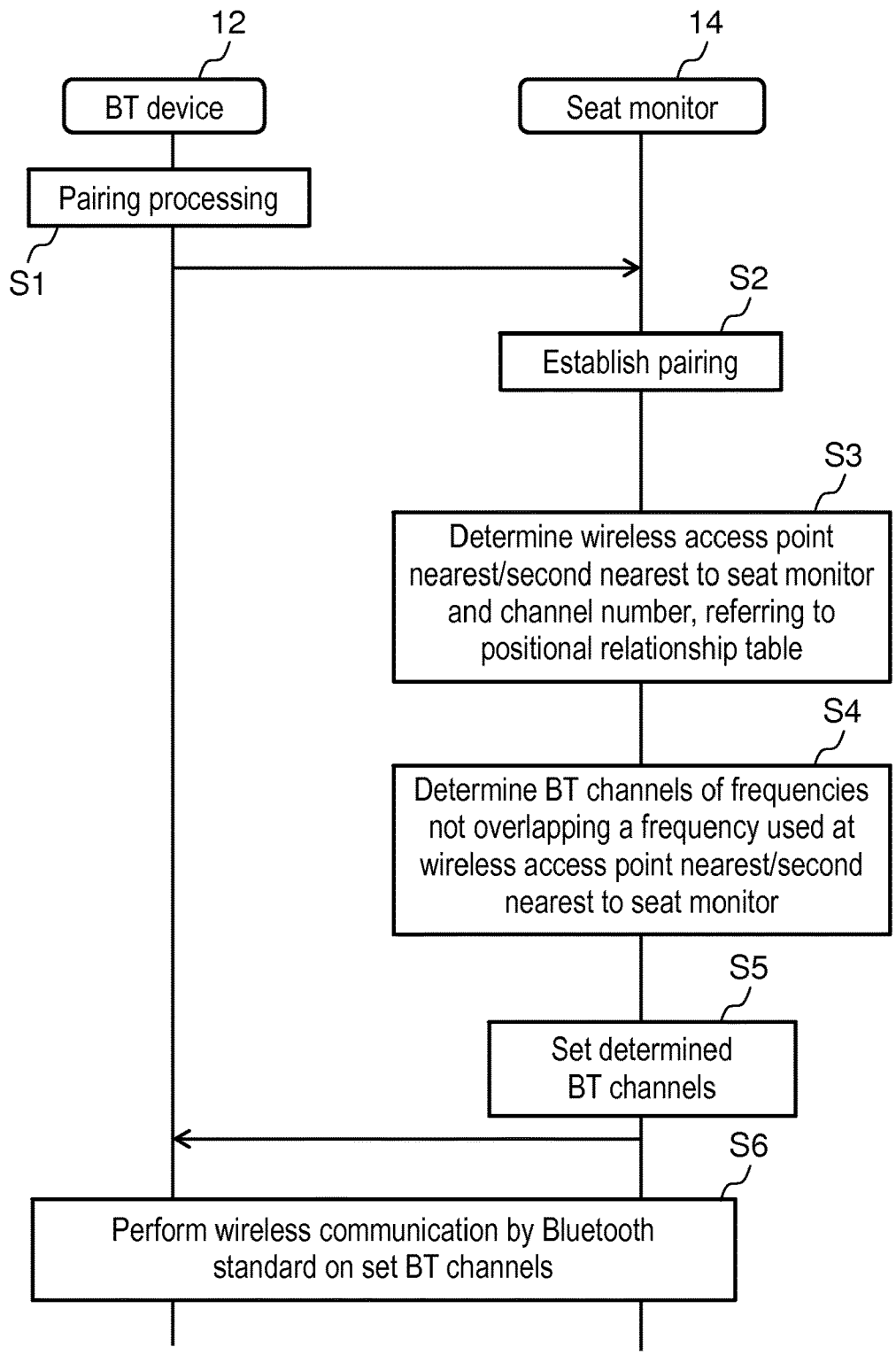
FIG. 9 is a chart showing processing of setting Bluetooth channels performed between BT terminal 12 and seat monitor 14, and respective processing procedures of BT terminal 12 and seat monitor 14.

FIG. 9 shows processing of setting Bluetooth channels performed between BT terminal 12 and seat monitor 14, and respective processing procedures of BT terminal 12 and seat monitor 14. FIG. 9 is an example of processing until Bluetooth channels on which to perform Bluetooth standard communication are set by seat monitor 14, and communication with BT terminal 12 is performed. This processing does not involve server device 10. To facilitate understanding, the processing will be described as one performed between seat monitor 14a and BT terminal 12a in FIG. 4.

In step S1, CPU 201 of BT terminal 12a performs pairing processing with seat monitor 14a as a partner. The pairing processing is performed using a plurality of predetermined Bluetooth channels of specific frequencies.

In step S2, pairing is established between BT terminal 12a and seat monitor 14a.

In step S3, referring to the positional relationship table (Table 1), CPU 401 of seat monitor 14a determines the nearest/the second nearest wireless access points of seat monitor 14a and channel numbers. In the example in Table 1, the nearest wireless access point 18a (FIG. 4) and channel number 1 are specified, and as the second nearest wireless access point, wireless access point 18b (FIG. 4) and channel number 6 are specified. In the example in Table 1, for seat monitor 14b shown in FIG. 4, the second nearest wireless access point is not specified, and only the nearest wireless access point is specified.

In step S4, from the channel numbers of the wireless access points, CPU 401 of seat monitor 14a determines their frequency bands, and further determines Bluetooth channels belonging to frequency bands not overlapping the frequency bands of the channel numbers. As is evident from FIG. 3, channel numbers and frequency bands are standardized. Thus, when a channel number of a wireless access point is found, it is possible to determine a frequency band of the channel number, and further, Bluetooth channels belonging to a frequency band that does not overlap the frequency band of the channel number can be determined. As shown in FIG. 5(a), CPU 401 of seat monitor 14a does not use Bluetooth channels in frequency bands corresponding to channels 1 and 6 of the wireless access points, and determines Bluetooth channels in other frequency bands.

In step S5, CPU 401 of seat monitor 14a sets the determined Bluetooth channels. Then, CPU 401 notifies BT terminal 12a of Bluetooth channels to be used.

In step S6, BT terminal 12a and seat monitor 14a perform Bluetooth standard communication using the set Bluetooth channels.

Figure 10:
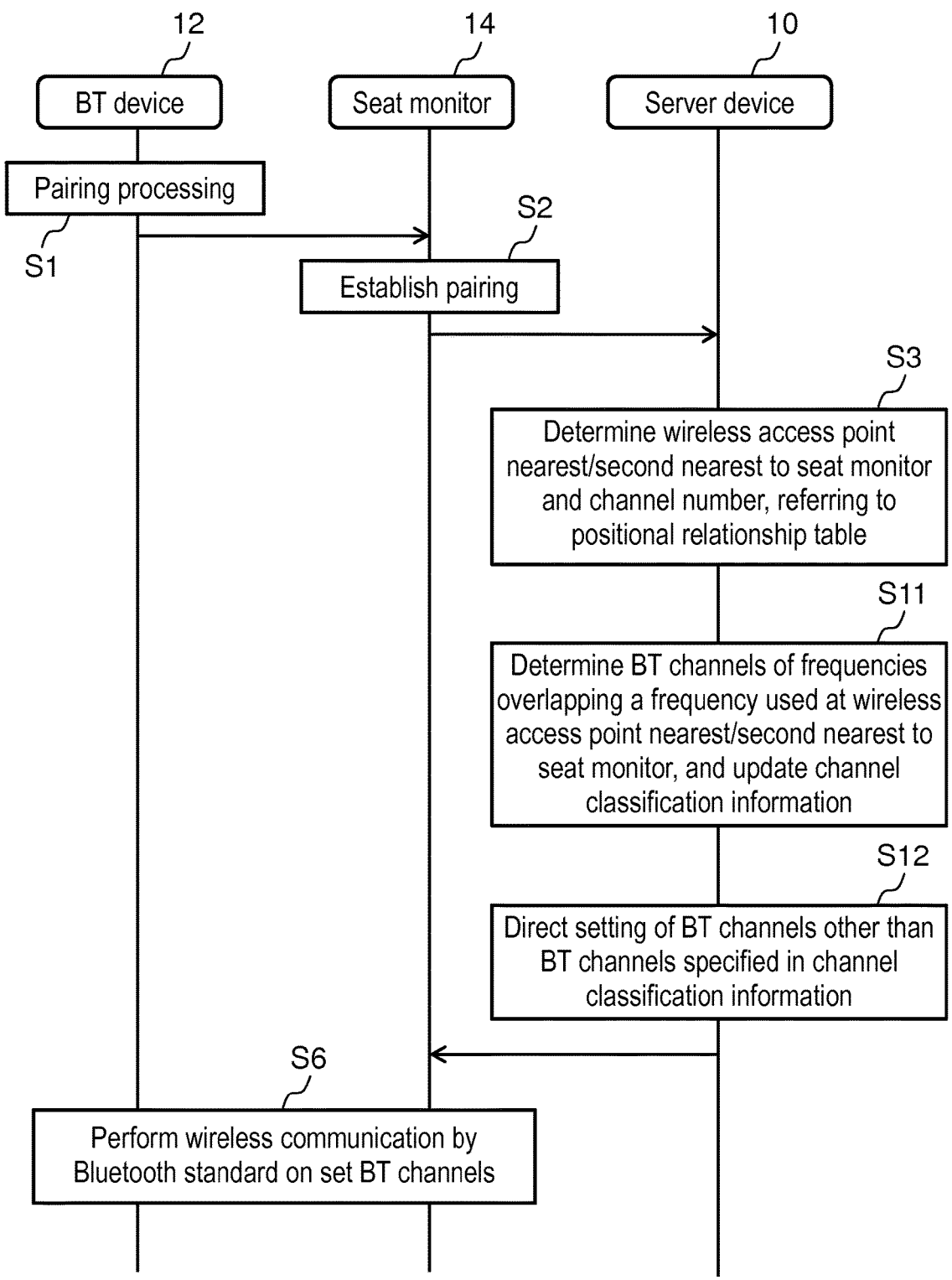
FIG. 10 is a chart showing processing of setting Bluetooth channels mainly on server device 10.

FIG. 10 shows processing of setting Bluetooth channels mainly on server device 10. In steps in FIG. 10, steps included in FIG. 9 are denoted by the same reference numerals, and will not be described. While step S3 in FIG. 9 is performed by CPU 401 of seat monitor 14, step S3 in FIG. 10 is performed by CPU 201 of server device 10. Otherwise, the processing is the same.

In step S11, CPU 201 of server device 10 determines Bluetooth channels of frequencies overlapping a frequency that is used at wireless access point 18 nearest to seat monitor 14, and updates channel classification information. As described above, in channel classification information managed by server device 10, an attribute of Bad/Unknown is set for Bluetooth channels. In this exemplary embodiment, in order to avoid use of Bluetooth channels overlapping a Wi-Fi channel, information on such Bluetooth channels is set in channel classification information.

In step S12, CPU 201 of server device 10 directs setting of BT channels other than the BT channels specified in the channel classification information. As a result of this processing, Bluetooth channels not interfering with a Wi-Fi channel are set between seat monitor 14 and BT terminal 12.

In the description so far, a Wi-Fi channel used by nearest or second nearest wireless access point 18 is grasped, based on a distance between seat monitor 14 and each wireless access point 18. This distance has been described as a three-dimensionally measured distance between seat monitor 14 and each wireless access point 18, with a height direction taken into account. However, this is an example. An installation interval between wireless access point 18 and seat monitor 14 in an aircraft width direction may further be taken into account. The reason why a need to take "aircraft width direction" into account arises is that wireless access points are not necessarily arranged in a straight line when located from directly above the aircraft. For example, wireless access points can be arranged in a zigzag (alternately) above two passages. When three-dimensional or two-dimensional distances are considered, there can be a case where it is required to take installation positions in an aircraft width direction into account, in view of such a zigzag arrangement.

Alternatively, the distance may be a two-dimensionally measured distance (e.g. on a drawing) without taking a height difference between wireless access point 18 and seat monitor 14 into account. Alternatively, the distance may be a one-dimensional distance without taking a height difference between wireless access point 18 and seat monitor 14 and an installation interval between wireless access point 18 and seat monitor 14 in the aircraft width direction into account.

As a positional relationship between each seat monitor and the nearest wireless access point, the following information may be used in place of a distance.

(1) A seat number that can identify a position of a seat in which seat monitor 14 is installed as position information on seat monitor 14, and position information on wireless access point 18

(2) Position information may be based on LOPA (Lay Out of Passenger Accommodation: layout information on an aircraft passenger cabin).

(3) Intensity of a signal from wireless access point 18

(4) An IP address of a Bluetooth device. Server device 10 may hold a correspondence relationship between an IP address of a Bluetooth device and position information, and may determine channels to be used/not to be used for the Bluetooth device, based on the IP address of the Bluetooth device.

A distance between seat monitor 14 and wireless access point 18 may be variable or may be fixed.

In this exemplary embodiment, BT channels to be used are determined, using positional relationships between seat monitors and wireless access points. However, positional relationships between BT terminals in place of seat monitors and wireless access points may be used. When BT terminals are portable, positional relationships are not fixed. However, when a BT terminal is provided to each seat, a position of a BT terminal can be set approximately and fixedly. Thus, the above-described processing can be applied with positional relationships between BT terminals and wireless access points held in advance.

1-4. Effects and Others

As above, in this exemplary embodiment, wireless communication system 100 includes BT terminals 12 and seat monitors 14 that perform wireless communication with each other by a first communication scheme (Bluetooth standard communication scheme), and a plurality of wireless access points 18 that can perform wireless communication by a second communication scheme (Wi-Fi standard communication scheme) different from the first communication scheme. A Bluetooth standard requires use of 20 or more communication channels out of 79 communication channels, and 65 to 68 communication channels out of the 79 communication channels overlap, in frequency, three communication channels used in a Wi-Fi standard that do not interfere with each other. Subtraction of a number of 65 to 68 communication channels overlapping in frequency bands with the communication channels used in the Wi-Fi standard from the 79 communication channels used in the Bluetooth standard results in a number smaller than a minimum number of communication channels (20) required to be used in the Bluetooth standard. That is, only with frequency bands not overlapping frequency bands of the Wi-Fi standard, Bluetooth standard communication channels cannot be provided. At this time, m (m: a positive integer, $2 \leq m < 79$) communication channels are used in wireless communication between BT terminal 12 and seat monitor 14, and the m communication channels are determined according to positional relationship between seat monitor 14 and each of the plurality of wireless access points 18.

According to this exemplary embodiment, communication channels are determined according to positional relationship between seat monitor 14 and each of the plurality of wireless access points 18. For example, it is expected that use of a Wi-Fi standard communication channel used by wireless access point 18 in a position relatively near to seat monitor 14 provides a relatively great effect of interference. Thus, setting Bluetooth channels avoiding the Wi-Fi channel allows communication based on the Wi-Fi standard and the Bluetooth standard to be performed independently.

Second Exemplary Embodiment 2-1. Configuration

[2-1-1. Network Environment]

Like wireless communication system 100 in the first exemplary embodiment, a wireless communication system includes BT terminals and Wi-Fi terminals, and communication compliant with a Wi-Fi standard and communication compliant with a Bluetooth standard are performed independently.

However, the wireless communication system according to this exemplary embodiment reduces interference of the Bluetooth standard by a method different from the method of wireless communication system 100 in the first exemplary embodiment, due to a difference in configuration described below. Hereinafter, the difference in configuration will be described.

In wireless communication system 100 in the first exemplary embodiment, wireless access points are installed so that there are areas that allow communication without causing mutual radio wave interference, and different channels are set for adjacent wireless access points.

In wireless communication system 101 in this exemplary embodiment, wireless access points are each connected to so-called leaky feeder cables. As a result, Wi-Fi terminal 16 can communicate on any Wi-Fi channel in a passenger cabin of aircraft 1.

Figure 11:
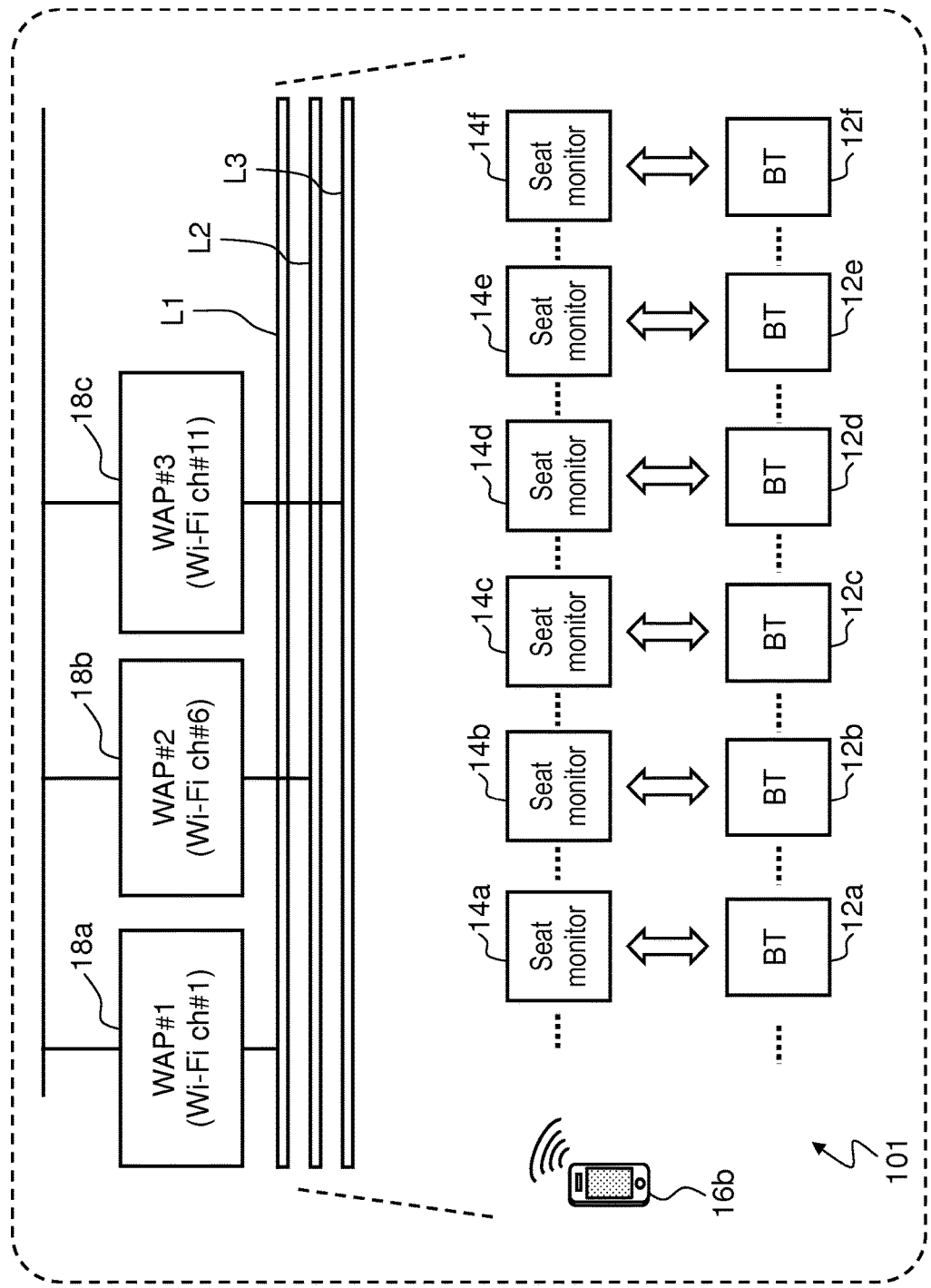
FIG. 11 is a diagram illustrating a configuration of wireless communication system 101 according to a second exemplary embodiment.

FIG. 11 illustrates a configuration of wireless communication system 101 according to this exemplary embodiment. As in FIGS. 1 and 2, suppose that wireless communication system 101 according to this exemplary embodiment is also provided in aircraft 1.

A leaky feeder cable is an electric wire used for communication, and is a cable designed to function as an antenna by leaking radio waves, as well as to transmit signals. For example, a cable is provided with elongated slots to emit radio waves to the surroundings of the cable. This allows radio waves to be emitted or received along the cable.

FIG. 11 illustrates wireless access points 18a to 18c connected to leaky feeder cables L1 to L3. Each of wireless access points 18a to 18c can give and receive signals of a frequency of a channel set for itself via cables L1 to L3. Cables L1 to L3 are laid on a passenger cabin ceiling in aircraft 1. Radio waves of all Wi-Fi channel frequency bands reach throughout the passenger cabin, regardless of seat positions. Thus, Wi-Fi terminal 16b can communicate on any Wi-Fi channel in the passenger cabin. In this exemplary embodiment, Wi-Fi channels used are three, channels 1, 6 and 11, and thus three wireless access points 18a to 18c are provided.

BT terminals 12a to 12f and seat monitors 14a to 14f are identical to those in the first exemplary embodiment, and each perform Bluetooth standard communication using a plurality of Bluetooth channels.

[2-1-2. Frequency Band]

In this exemplary embodiment, frequency bands used in the Bluetooth standard and the Wi-Fi standard are identical to the frequency bands in the above section 1-1-2 (e.g. FIG. 3). Thus, their descriptions will not be made.

[2-1-3. Problems Recognized by the Inventor(s) of the Present Disclosure and Findings of the Inventor(s) of the Present Disclosure]

It is impossible to provide a sufficient number of Bluetooth channels that do not interfere with a Wi-Fi channel under an environment where three Wi-Fi channels are emitted throughout a passenger cabin as in wireless communication system 101. Therefore, interference of radio waves occurs between communication based on the Wi-Fi standard and communication based on the Bluetooth standard. This is the same under an environment where leaky feeder cables L1 to L3 are not used, for example, an environment where three Wi-Fi channels are located in the vicinity of seat monitor 14.

The inventor(s) of the present disclosure have found a method of reducing an effect of interference of communication based on Wi-Fi and Bluetooth by setting Bluetooth channels by a method below.

Figure 12:
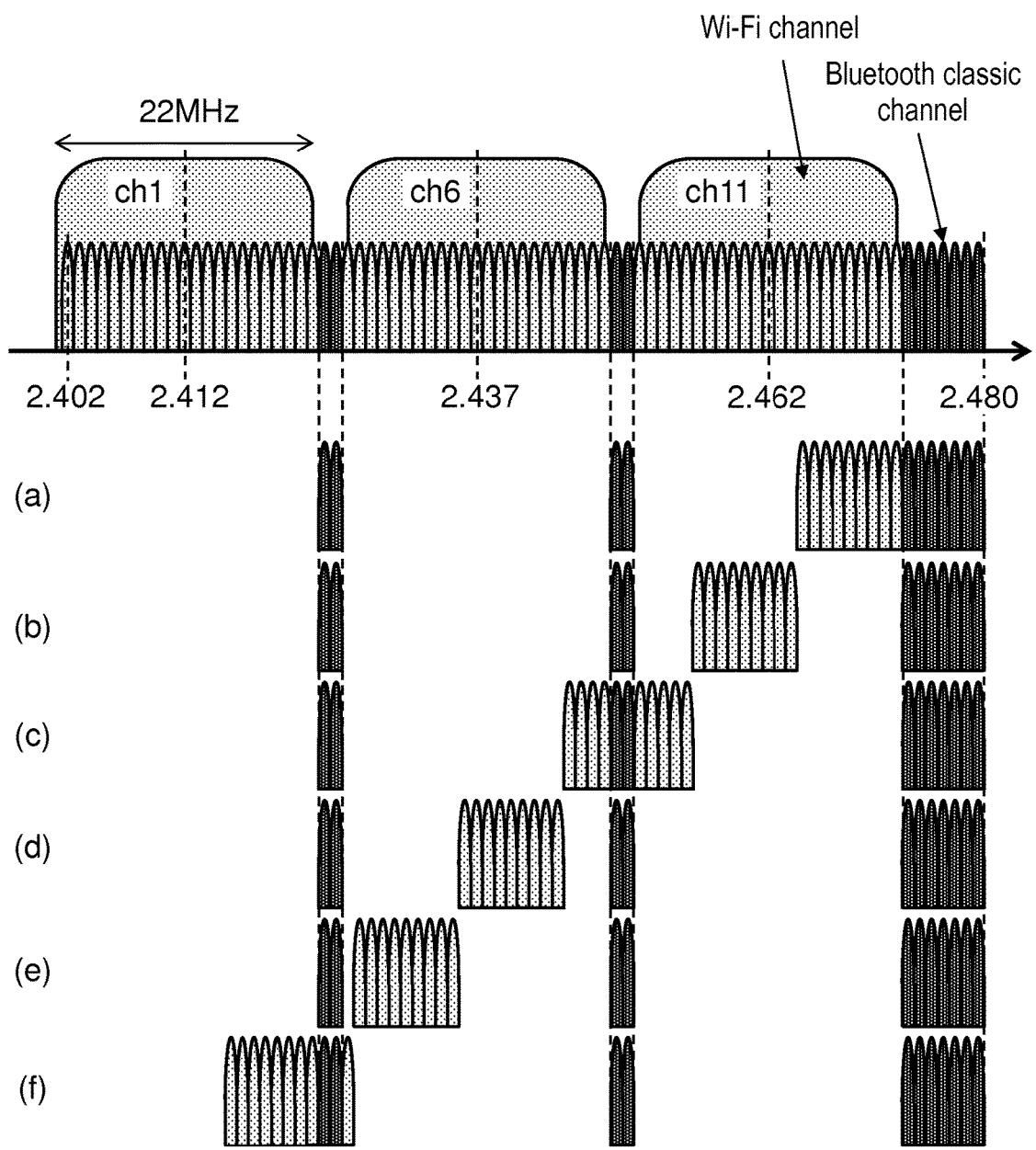
FIG. 12 is a diagram illustrating an example of Bluetooth channel allocation according to the second exemplary embodiment that can reduce interference between Wi-Fi channels and Bluetooth channels.

FIG. 12 illustrates an example of Bluetooth channel allocation according to this exemplary embodiment found by the inventor(s) of the present disclosure, which can reduce interference between Wi-Fi channels and Bluetooth channels. FIG. 12 (a) to (f) show examples of application to BT terminals 12n and seat monitors 14n (n: a to f) in FIG. 11, respectively. Hereinafter, suppose that selection and setting of Bluetooth channels are performed by each of seat monitors 14a to 14f.

Each of seat monitors 14a to 14f preferentially selects Bluetooth channels that do not interfere with Wi-Fi (priority Bluetooth channels). Priority Bluetooth channels may be determined in advance, or may be determined from a Wi-Fi channel being used at a point in time when Bluetooth standard communication is performed.

Priority Bluetooth channels are, in FIG. 12, Bluetooth channels corresponding to a frequency band between Wi-Fi channels 1 and 6, Bluetooth channels corresponding to a frequency band between Wi-Fi channels 6 and 11, and Bluetooth channels in a frequency band higher than Wi-Fi channel 11.

Subsequently, each of seat monitors 14a to 14f selects Bluetooth channels other than the Priority Bluetooth channels, that is, Bluetooth channels interfering with a Wi-Fi channel (hereinafter described as "interference Bluetooth channels") until a sum total of Bluetooth channels including the previously preferentially selected ones becomes 20. At this time, selection of interference Bluetooth channels is controlled to be even among seat monitors 14a to 14f. Even selection of interference Bluetooth channels reduces occurrence of packet collisions on interference Bluetooth channels. Thus, a retransmission rate in Bluetooth communication is reduced, and indirectly, interference with Wi-Fi communication can also be reduced.

As above, in wireless communication system 101 according to this exemplary embodiment, out of the 79 channels used in the Bluetooth standard, a number of Bluetooth channels belonging to a frequency band that does not overlap the frequency bands of the three communication channels used in the Wi-Fi standard are preferentially used.

Further, when there are a plurality of pairs of BT terminals 12 and seat monitors 14, and a number of channels required in the Bluetooth standard cannot be provided, a shortage of Bluetooth channels is made up by Bluetooth channels determined from among Bluetooth channels remaining when preferentially set Bluetooth channels are removed from all the Bluetooth standard channels, so as to be substantially evenly distributed among seat monitors 14.

2-2. Details of Configuration of Wireless Communication System 101 According to the Present Disclosure Hardware of the components of wireless communication system 101 is substantially the same as hardware of the components of wireless communication system 100 according to the first exemplary embodiment. Therefore, for a configuration of server device 10, description in the above-described section 1-2-1 will be quoted, for a configuration of BT terminal 12, description in the above-described section 1-2-2 will be quoted, and for a configuration of seat monitor 14, description in the above-described section 1-2-3 will be quoted. Difference will be described in connection with an operation described next.

2-3. Operation

Hereinafter, an operation performed in wireless communication system 101 will be described.

Figure 13:
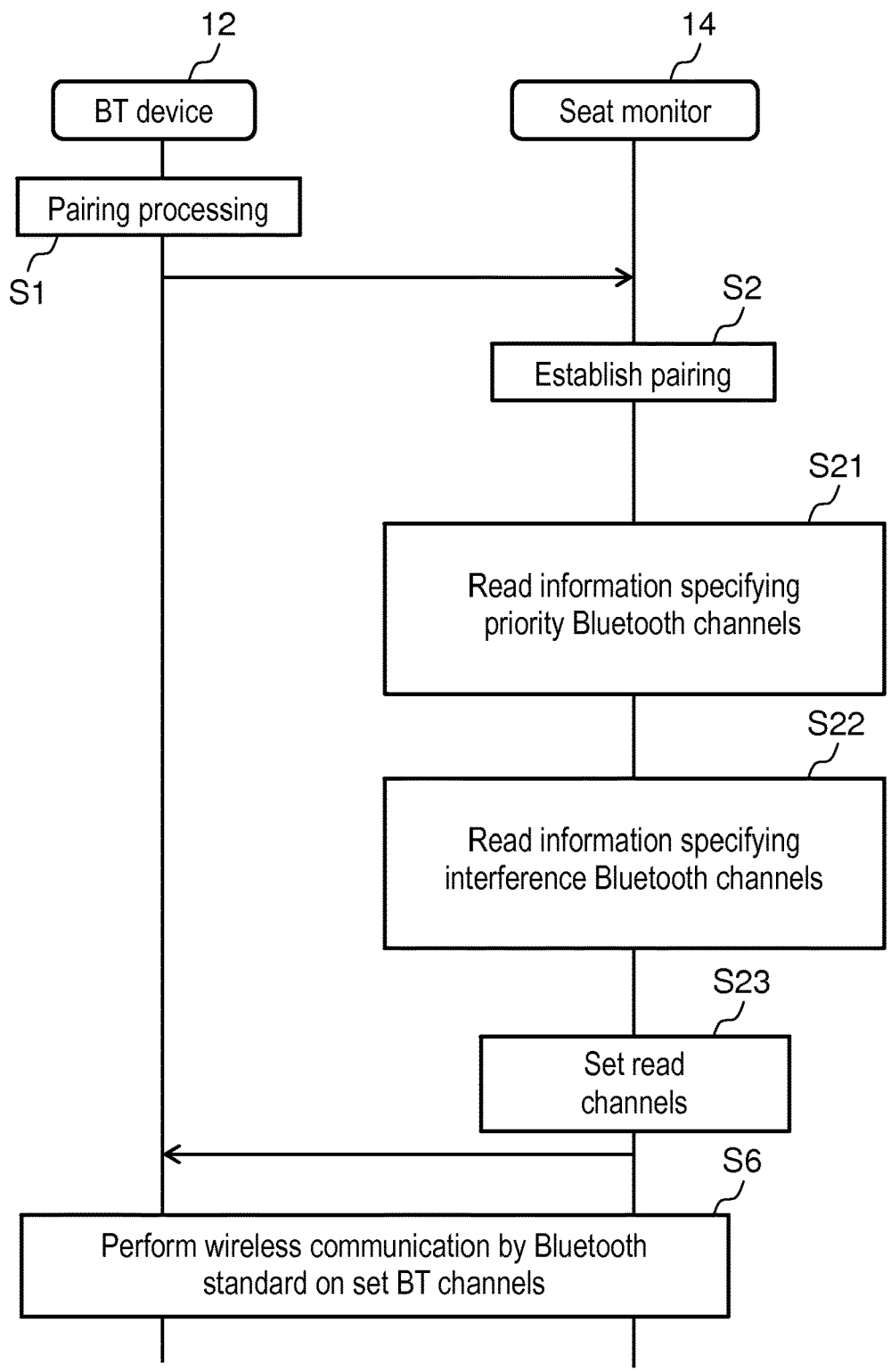
FIG. 13 is a chart showing processing of setting Bluetooth channels performed between BT terminal 12 and seat monitor 14, and respective processing procedures of BT terminal 12 and seat monitor 14.

FIG. 13 shows Bluetooth channel setting processing performed between BT terminal 12 and seat monitor 14, and respective processing procedures of BT terminal 12 and seat monitor 14. FIG. 13 is an example of processing until Bluetooth channels on which to perform Bluetooth standard communication are set by seat monitor 14, and communication with BT terminal 12 is performed. This processing does not involve server device 10. To facilitate understanding, the processing will be described as processing performed between seat monitor 14a and BT terminal 12a in FIG. 11.

In steps in FIG. 13, steps included in FIG. 9 are denoted by the same reference numerals, and will not be described. In the following, suppose that Wi-Fi channels to be used are preset, and further, Bluetooth channels to be used are also preset.

In step S21, CPU 401 of seat monitor 14a reads information specifying predetermined priority Bluetooth channels.

Then in step S22, CPU 401 reads information specifying predetermined interference Bluetooth channels. Information specifying priority Bluetooth channels and information specifying interference Bluetooth channels are previously stored in memory 402 or flash memory 403 as information unique to each seat monitor 14. Interference Bluetooth channels are set in advance for each seat monitor 14 so as to be used evenly by all seat monitors 14.

In step S23, CPU 401 sets the read information specifying priority Bluetooth channels and information specifying interference Bluetooth channels.

In step S22, information specifying interference Bluetooth channels is read unconditionally because Wi-Fi channels and Bluetooth channels are illustrated in this exemplary embodiment. However, when, by using a different communication standard, a number of channels required by the standard is within a number of priority channels, processing in step S22 is unnecessary. Alternatively, a step to determine whether channels other than priority channels are necessary may be interposed between steps S21 and 22, for example, so that when necessary, the processing proceeds to step S22.

In step S22, interference Bluetooth channels are set in advance for each seat monitor 14 so as to be used evenly by all seat monitors 14. As a modification, each seat monitor 14 may autonomously determine interference Bluetooth channels. Specifically, seat monitors 14 communicate with each other, and mutually give and receive channel classification information specifying interference Bluetooth channels currently being used. Then, CPU 401 of seat monitor 14 may identify Bluetooth channels of low frequency of use and determine the Bluetooth channels as interference Bluetooth channels so that interference Bluetooth channels are substantially evenly distributed among seat monitors 14.

Figure 14:
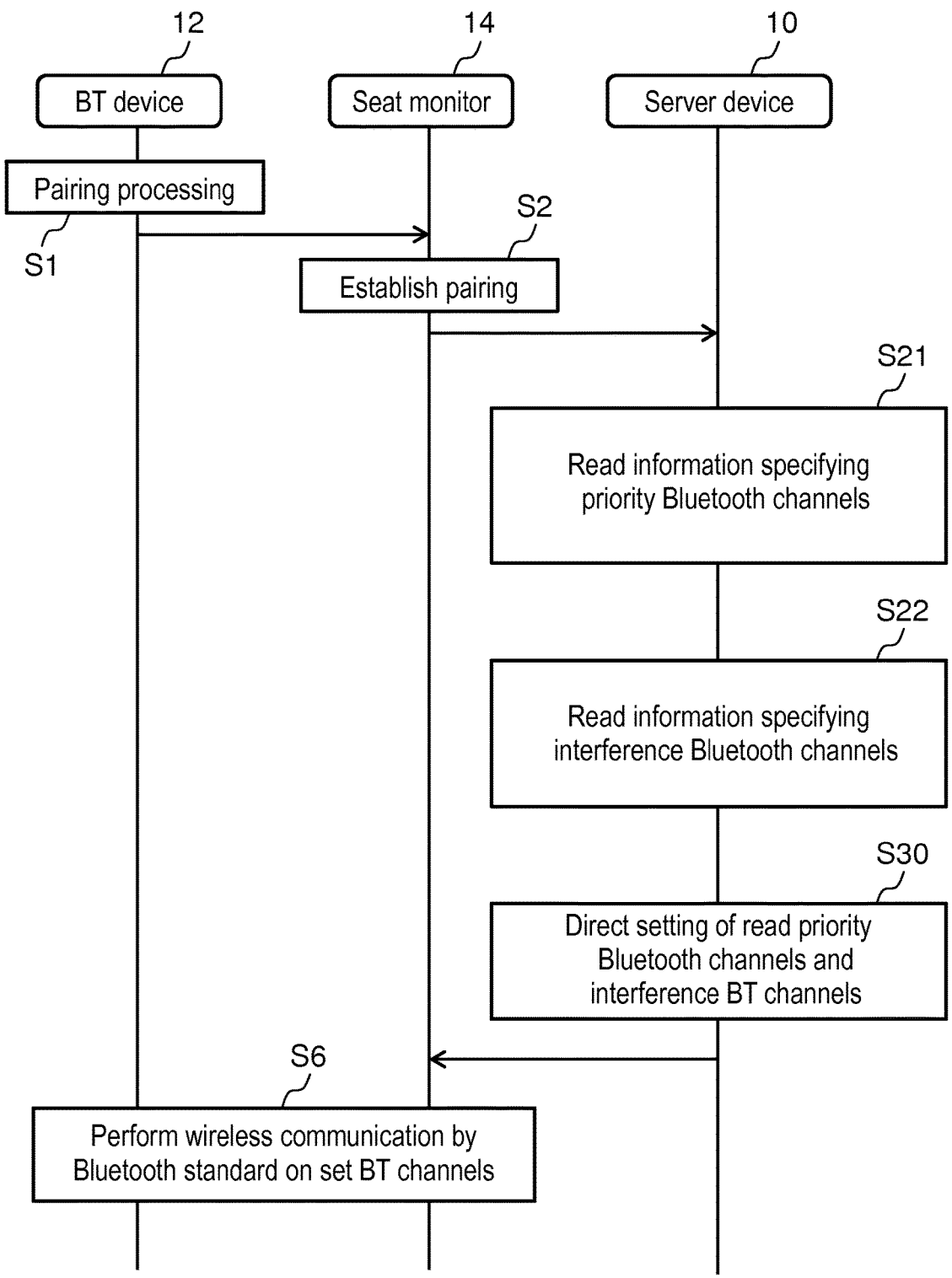
FIG. 14 is a chart showing processing of setting Bluetooth channels mainly on server device 10.

FIG. 14 shows Bluetooth channel setting processing mainly on server device 10. In steps in FIG. 14, steps included in FIG. 10 or 13 are denoted by the same reference numerals, and will not be described. While steps S21 and 22 in FIG. 13 are performed by CPU 401 of seat monitor 14, steps S21 and 22 in FIG. 14 are performed by CPU 201 of server device 10. Otherwise, the processing is the same.

In step S30, CPU 201 of server device 10 directs seat monitor 14 to set read priority Bluetooth channels and interference Bluetooth channels. Server device 10 in the first exemplary embodiment (FIG. 10) gives the direction to seat monitor 14, using channel classification information, but in this exemplary embodiment, a framework of channel classification information is not particularly used because server device 10 controls Bluetooth channels so that interference Bluetooth channels are evenly distributed among seat monitors 14.

However, the above-described processing is also an example. Each seat monitor 14 may randomly select information on available interference Bluetooth channels, so that interference Bluetooth channels are evenly distributed, for example.

Figure 15:
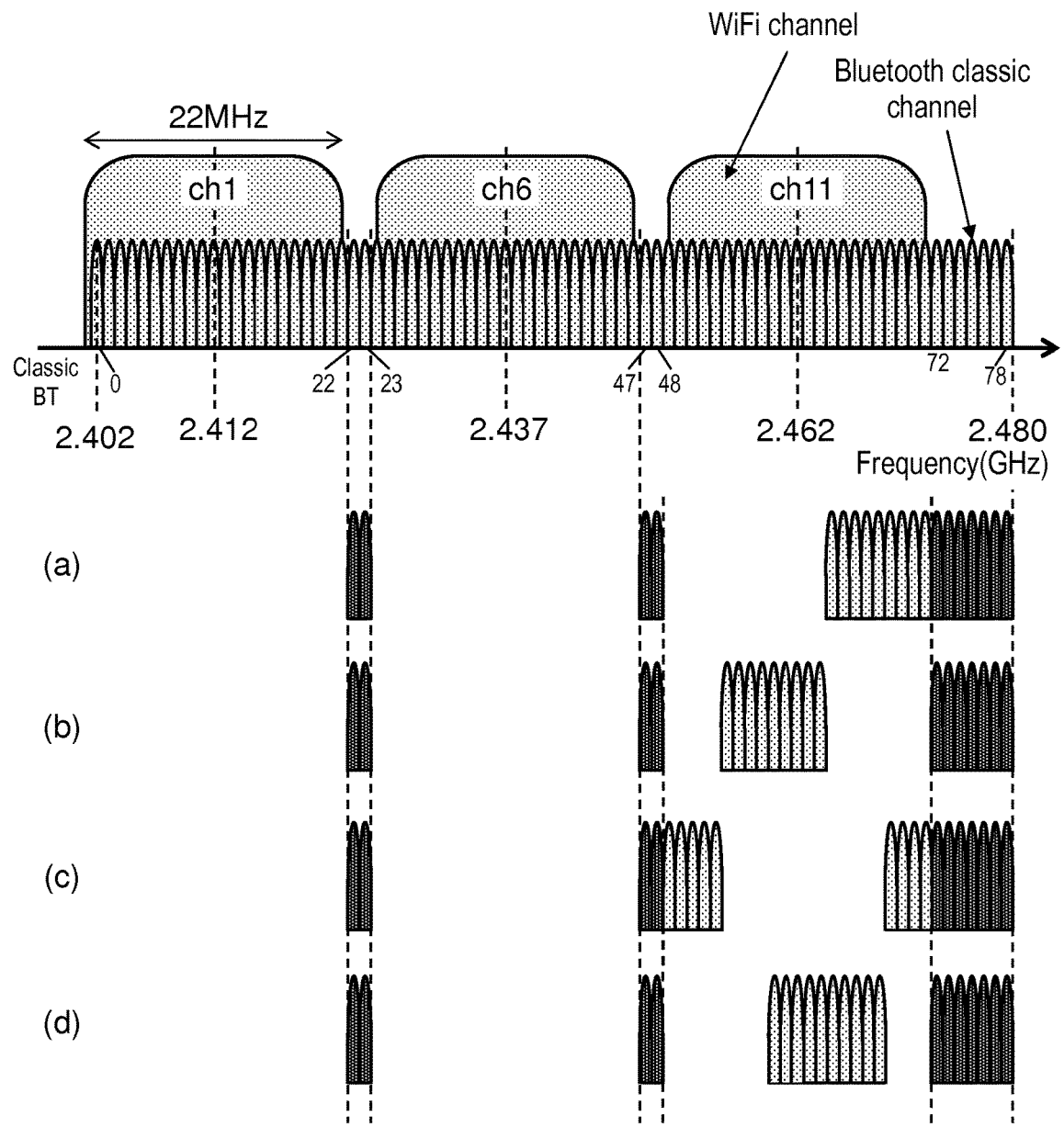
FIG. 15 is a diagram illustrating a modification on interference Bluetooth channels according to the second exemplary embodiment.

FIG. 15 illustrates a modification on interference Bluetooth channels according to this exemplary embodiment. In this example, priorities are assigned to channels belonging to interference Bluetooth channels. In FIG. 15, use of Bluetooth channels interfering with Wi-Fi channel 11 is prioritized over use of Bluetooth channels interfering with Wi-Fi channel 1 or 6.

2-4. Effects and Others

As above, in this exemplary embodiment, wireless communication system 101 includes a plurality of BT terminals 12 and a plurality of seat monitors 14 each of which performs wireless communication by a first communication scheme (Bluetooth standard communication scheme), and a plurality of wireless access points 18 that perform wireless communication by a second communication scheme (Wi-Fi standard communication scheme) different from the first communication scheme. In this wireless communication system 101, there are a plurality of pairs of BT terminals 12 and seat monitors 14 that perform one-to-one wireless communication. A Bluetooth standard requires use of 20 or more communication channels out of 79 communication channels, and 65 to 68 communication channels out of the 79 communication channels overlap, in frequency, three communication channels used in a Wi-Fi standard that do not interfere with each other. Subtraction of a number of 65 to 68 communication channels overlapping in frequency band with the communication channels used in the Wi-Fi standard from the 79 communication channels used in the Bluetooth standard results in a number smaller than a minimum number of communication channels (20) required to be used in the Bluetooth standard. That is, Bluetooth standard communication channels cannot be provided only in frequency bands not overlapping frequency bands of the Wi-Fi standard. At this time, when m (m: a positive integer, 20≤m<79) communication channels are used for Bluetooth communication in each pair of BT terminal 12 and seat monitor 14, out of the 79 communication channels, a number of communication channels belonging to a frequency band not overlapping a communication channel used in the Wi-Fi standard are preferentially used.

Thus, interference effect can be reduced at least for Bluetooth standard communication using these communication channels.

Remaining m−(79−20) communication channels of m communication channels used in wireless communication in each pair of BT terminal 12 and seat monitor 14 are evenly selected from among the 65 to 68 communication channels overlapping the three communication channels used in the Wi-Fi standard.

Thus, Bluetooth channels are set with effect of interference with Wi-Fi channels distributed, allowing communication based on the Wi-Fi standard and the Bluetooth standard.

Other Exemplary Embodiments

As above, the first and second exemplary embodiments have been described as examples of technology disclosed in the present application. However, the technology in the present disclosure is not limited to them, and can be applied to exemplary embodiments in which alteration, replacement, addition, omission, or the like is made as appropriate.

In any of the above-described exemplary embodiments, seat monitor 14 may further set Bluetooth channels to be used/not to be used, based on the following information.

(a) Information on a Wi-Fi congestion status (for example, a number of devices connected, and an amount of communication data) is used. By not using Bluetooth channels in the same frequency band as a congested Wi-Fi channel, interference of Bluetooth communication can be reduced.

(b) Information on a Bluetooth congestion status is used. When Bluetooth communication is congested, Bluetooth channels in the same frequency band as a Wi-Fi channel may be positively used.

(c) A profile of an external terminal connected to a Bluetooth device is used.

An HID (Human Interface Device) profile communicates with small packets with a low CIR (Carrier-to-Interference Ratio) (effect of being interfered and interfering are small). Bluetooth channels in the same frequency band as a Wi-Fi channel are also used.

A PAN (Personal Area Network) profile/A2DP (Advanced Audio Distribution Profile) communicates with large packets that require a high CIR (effect of being interfered and interfering are large). Bluetooth channels in the same frequency band as a Wi-Fi channel are used as little as possible.

(d) Information on an aircraft flight status is used. Bluetooth communication may be prohibited from use until an altitude of 10,000 meters is reached.

(e) Information on use-prohibited frequency determined locally by an airline is used. This is to avoid use of the frequency band at all times.

Alternatively, seat monitor 14 may control Bluetooth communication of its own device. For example, seat monitor 14 may control Bluetooth communication of its own based on the following information.

(a) Unavailable packet information. In order to reduce effect of being interfered and interfering, it is sometimes preferable not to use large packets.

(b) Maximum transmission power. In order to reduce interfering, it is sometimes preferable to reduce maximum transmission power.

(c) Control may be performed so that seat monitor 14 connected to a server device becomes a master device at all times. As described above, three methods have been described as methods of determining Bluetooth channels to be used/not to be used for Bluetooth communication. Specifically, (1) a method based on channel classification information set to Bad/Unknown by a higher-level device, (2) a method based on channel classification information determined as Good/Bad/Unknown by a Bluetooth master device from measurement, and (3) a method based on channel classification information reported as Good/Bad/Unknown from a slave device. A master device has a right to finally determine which method to use. Therefore, in order to increase a possibility that channel classification information set to Bad/Unknown from a higher-level device (server device 10) is reflected in Bluetooth communication, it is better that seat monitor 14 connected to server device 10 is set as a master device.

In the above-described exemplary embodiments, BT terminal 12 is connected to seat monitor 14, which does not need to have display means such as an LCD or input means such as a touch panel, and may be a seat electronics box (SEB) installed under a seat, for example. It is essential only that seat monitor 14 is connected to server device 10.

In the above-described exemplary embodiments, BT terminal 12 has been described as being provided to each seat on aircraft 1, but may be a communication device supporting a Bluetooth standard, carried onto aircraft 1 by a passenger.

BT terminal 12 is not limited to headphones and may be a smartphone or a wearable device in a form of a watch or glasses, for example.

A function provided by BT terminal 12 is not limited to music reproduction, and BT terminal 12 may provide a function of a wireless control device (i.e. remote controller) of a seat monitor.

In the above-described exemplary embodiments, a communication system has been described as being provided in an aircraft, but being in an aircraft is an example. The communication system may be provided in any location such as in a building, outdoors, in a tunnel, or in an automobile or a train.

In each exemplary embodiment described above, the Wi-Fi standard and the Bluetooth Classic standard have been illustrated as communication standards that use a frequency band in the vicinity of 2.4 GHz. However, these are an example. In place of the Bluetooth Classic standard, a Bluetooth LE standard may be used. When, in addition to the Wi-Fi standard and the Bluetooth standard, there are two or more communication standards that use overlapping frequency bands and can cause channel overlapping, the present disclosure can be applied to any combination of them.

As above, the exemplary embodiments have been described as illustration of the technology in the present disclosure. For that purpose, the accompanying drawings and the detailed descriptions have been provided.

Therefore, the components described in the accompanying drawings and the detailed descriptions can include not only components essential to solve the problems, but also components inessential to solve the problems to illustrate the technology. Thus, the inessential components should not be recognized as essential directly based on the fact that the inessential components are described in the accompanying drawings and the detailed descriptions.

The above-described exemplary embodiments are intended to illustrate the technology in the present disclosure, and thus various alterations, replacements, additions, omissions, and the like can be made in the scope of the claims or in the scope of the equivalents.

The present disclosure can be applied to a communication system in which two or more communication schemes using overlapping frequency bands can be used. The present disclosure can also be applied as a terminal device and a server device used in such a communication system.

What is claimed is:

1. A wireless communication system comprising:
   a terminal device that performs wireless communication in a first communication scheme with a first wireless communication device; and
   a plurality of second wireless communication devices configured to perform wireless communication in a second communication scheme that is different from the first communication scheme, the second wireless communication devices functioning as access points, wherein:
   the wireless communication system utilizes, out of M (M: a positive integer) communication channels, P (P: a positive integer, P<M) or more communication channels in the first communication scheme,
   N (N: a positive integer, N<M) communication channels out of the M communication channels overlap, in frequency, K (K: a positive integer, K<N) communication channels used in the second communication scheme, when P>(M−N) is established, the wireless communication system selects m (m: a positive integer, P≤m<M) communication channels in wireless communication between the first wireless communication device and the terminal device, the terminal device performs the wireless communication in the first communication scheme with the first wireless communication device by utilizing the selected m communication channels, and the wireless communication system selects the m communication channels according to a positional relationship between the terminal device and each of the plurality of second wireless communication devices.

2. The wireless communication system according to claim 1, wherein the terminal device comprises:

a wireless communication circuit that performs wireless communication in the first communication scheme; and a processor that determines the m communication channels to be used in communication based on the first communication scheme, or (M−m) communication channels not to be used in communication based on the first communication scheme, according to the positional relationship.

3. The wireless communication system according to claim 2, further comprising a memory that holds position information showing the positional relationship, wherein the processor determines the m communication channels or the (M−m) communication channels, based on the position information held in the memory.

4. The wireless communication system according to claim 2, wherein the positional relationship is either a distance between the terminal device per se and each of the plurality of second wireless communication devices, or a position where the terminal device per se is installed and a position where each of the plurality of second wireless communication devices is installed.

5. The wireless communication system according to claim 4, wherein the processor further determines the m communication channels to be used in communication based on the first communication scheme, or the (M−m) communication channels not to be used in communication based on the first communication scheme, according to intensity of a radio wave emitted from each of the plurality of second wireless communication devices.

6. The wireless communication system according to claim 4, wherein when the position information is information showing a distance between the terminal device and each of the plurality of second wireless communication devices, the processor determines a nearest second wireless communication device at a smallest distance from the terminal device, and determines the m communication channels from among a communication channel group in the first communication scheme belonging to a frequency band that does not overlap a frequency band of a communication channel used by the nearest second wireless communication device.

7. The wireless communication system according to claim 2, wherein when $K_1$ ($K_1$: a positive integer) communication channels out of the K communication channels is used to perform communication in the second communication scheme in a surrounding environment, the processor determines the m communication channels from among a communication channel group in the first communication scheme belonging to a frequency band not overlapping the $K_1$ communication channels, according to the positional relationship.

8. The wireless communication system according to claim 7, wherein when the terminal device is installed in a position where it is possible to perform wireless communication in the second communication scheme using, out of the K communication channels, either the $K_1$ communication channels or $K_2$ ($K_2$: a positive integer) communication channels different from the $K_1$ communication channels, the processor determines the m communication channels from among a communication channel group in the first communication scheme belonging to a frequency band not overlapping any of the $K_1$ and $K_2$ communication channels, according to the positional relationship.

9. A server device used in a wireless communication system that comprises:

a terminal device that performs wireless communication in a first communication scheme with a first wireless communication device; and a plurality of second wireless communication devices configured to perform wireless communication in a second communication scheme that is different from the first communication scheme, the second wireless communication devices functioning as access points, wherein:

the wireless communication system utilizes, out of M (M: a positive integer) communication channels, P (P: a positive integer, P<M) or more communication channels in the first communication scheme, N (N: a positive integer, N<M) communication channels out of the M communication channels overlap, in frequency, K (K: a positive integer, K<N) communication channels used in the second communication scheme, when P>(M−N) is established, m (m: a positive integer, P≤m<M) communication channels are used in wireless communication between the first wireless communication device and the terminal device, the server device comprising:

a memory that holds position information showing the positional relationship;

a processor that selects the m communication channels to be used in wireless communication by the first wireless communication device, according to the positional relationship between the terminal device and each of the plurality of second wireless communication devices; and a communication circuit that transmits information specifying the selected m communication channels to the terminal device via at least one of the plurality of second wireless communication devices.

10. A wireless communication system comprising:

a plurality of terminal devices each of which performs wireless communication in a first communication scheme with a plurality of first wireless communication devices; and a plurality of second wireless communication devices that perform wireless communication in a second communication scheme different from the first communication scheme, and function as access points, wherein:

the wireless communication system performs one-to-one wireless communication by a plurality of pairs between the plurality of first wireless communication devices and the plurality of terminal devices, the wireless communication system utilizes, out of M (M: a positive integer) communication channels, P (P: a positive integer, P<M) or more communication channels in the first communication scheme, N (N: a positive integer, N<M) communication channels out of the M communication channels overlap, in frequency, K (K: a positive integer, K<N) communication channels used in the second communication scheme, and when P>(M−N) is established, the wireless communication system selects m (m: a positive integer, P≤m<M) communication channels are used in the wireless communication in each of the plurality of pairs, out of the M communication channels, such that (M−N) communication channels belonging to a frequency band not overlapping a communication channel used in the second communication scheme are preferentially used in the m communication channels, and each of the plurality of pairs performs the wireless communication in the first communication scheme by using of the selected m communication channels.

11. The wireless communication system according to claim 10, wherein remaining m−(M−N) communication channels of the m communication channels used in the wireless communication in each of the plurality of pairs are evenly selected from among the N communication channels overlapping the K communication channels used in the second communication scheme.

12. The wireless communication system according to claim 10, wherein remaining m−(M−N) communication channels of the m communication channels used in the wireless communication in each of the plurality of pairs are selected from among n (n<N) communication channels belonging to a frequency band that overlaps a less than the K communication channels used in the second communication scheme.

13. A server device provided in a wireless communication system that comprises:

a plurality of terminal devices each of which performs wireless communication in a first communication scheme with a plurality of first wireless communication devices; and a plurality of second wireless communication devices that perform wireless communication in a second communication scheme different from the first communication scheme, and function as access points, wherein:

the wireless communication system performs one-to-one wireless communication by a plurality of pairs between the plurality of first wireless communication devices and the plurality of terminal devices, wherein, out of M (M: a positive integer) communication channels, P (P: a positive integer, P<M) or more communication channels are used in the first communication scheme, N (N: a positive integer, N<M) communication channels out of the M communication channels overlap, in frequency, K (K: a positive integer, K<N) communication channels used in the second communication scheme, when P>(M−N) is established, m (m: a positive integer, P≤m<M) communication channels are used in the wireless communication in each of the plurality of pairs, out of the M communication channels, such that (M−N) communication channels belonging to a frequency band not overlapping a communication channel used in the second communication scheme are preferentially used in the m communication channels, and remaining m−(M−N) communication channels of the m communication channels used in the wireless communication in each of the plurality of pairs are evenly selected from among the N communication channels overlapping the K communication channels used in the second communication scheme, the server device comprising:

a memory that holds channel information showing use status of communication channels in the first communication scheme used by the terminal devices, and non-priority communication channel information specifying (P−m) or more communication channels being used in the plurality of pairs;

a processor that selects a plurality of communication channels that are used relatively less from among remaining (M−m) communication channels, based on the non-priority communication channel information when a new pair of one of the plurality of first wireless communication devices and one of the plurality of terminal devices perform communication in the first communication scheme; and a communication circuit that transmits channel specification information specifying the plurality of selected communication channels to the terminal device in the new pair.

14. The server device according to claim 13, wherein the processor selects (P−m) or more communication channels to be used by the terminal device in the new pair from among the plurality of selected communication channels that are used relatively less; and the communication circuit transmits information specifying the (P−m) or more communication channels to the terminal device in the new pair as the channel specification information.

15. The wireless communication system according to claim 1, wherein each of the second wireless communication devices perform the wireless communication in the second communication scheme by using of a different channel from one another.

16. The server device according to claim 9, wherein each of the second wireless communication devices perform the wireless communication in the second communication scheme by using of a different channel from one another.

17. The wireless communication system according to claim 1, wherein the wireless communication system performs a wireless communication between the first wireless communication device and at least one of the plurality of second wireless communication device via the terminal device.

18. The wireless communication system according to claim 10, wherein the wireless communication system performs a wireless communication between at least one of the plurality of first wireless communication device and at least one of the plurality of second wireless communication device via at least one of the plurality of terminal devices.

* * * * *